United States Patent
Laroia et al.

(10) Patent No.: US 7,813,322 B2
(45) Date of Patent: Oct. 12, 2010

(54) EFFICIENT AUTOMATIC REPEAT REQUEST METHODS AND APPARATUS

(75) Inventors: Rajiv Laroia, Basking Ridge, NJ (US); Tom Richardson, South Orange, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1382 days.

(21) Appl. No.: 10/780,539

(22) Filed: Feb. 17, 2004

(65) Prior Publication Data

US 2004/0228320 A1    Nov. 18, 2004

Related U.S. Application Data

(60) Provisional application No. 60/448,667, filed on Feb. 19, 2003.

(51) Int. Cl.
  *H04L 1/00* (2006.01)
(52) U.S. Cl. .................. 370/333; 370/335; 455/69; 714/748
(58) Field of Classification Search ............... 370/310, 370/331–333, 335, 342; 455/69; 714/742, 714/748, 752
See application file for complete search history.

(56) References Cited

U.S. PATENT DOCUMENTS

| | | | | |
|---|---|---|---|---|
| 5,881,069 | A * | 3/1999 | Cannon et al. | 714/748 |
| 6,418,549 | B1 * | 7/2002 | Ramchandran et al. | 714/811 |
| 6,631,128 | B1 | 10/2003 | Lemieux | |
| 6,646,993 | B1 | 11/2003 | Davies et al. | |
| 6,661,784 | B1 | 12/2003 | Nykanen | |
| 6,895,010 | B1 * | 5/2005 | Chang et al. | 370/394 |
| 6,904,555 | B2 * | 6/2005 | Nagase et al. | 714/751 |
| 7,035,894 | B2 | 4/2006 | Park et al. | |

(Continued)

FOREIGN PATENT DOCUMENTS

EP    1156617    11/2001

(Continued)

OTHER PUBLICATIONS

PCT International Search Report, for International Application No. PCT/US04/04831, pp. 1-3, Apr. 13, 2006.

(Continued)

*Primary Examiner*—William Trost, IV
*Assistant Examiner*—Roberta A Shand
(74) *Attorney, Agent, or Firm*—Donald C. Kordich

(57) ABSTRACT

Different NAK signals are used to indicate different relative levels of success in regard to an unsuccessful attempt to decode a received signal. An ACK signal is used in the case of successful decoding. The device which generated and transmitted the original encoded signal receives the NAK signal and selects a portion of redundant information, e.g., additional error correction bits, to be transmitted based on the value of the NAK signal. If the NAK signal indicates a low level of decoding success indicating a relatively large number of errors in the decoded signal, a large set of redundant information is selected and transmitted. If the NAK signal indicates a relatively successful decoding, e.g., relatively few errors, a small set of redundant information is selected and transmitted. Where a small set of redundant information is transmitted new information can be transmitted with the redundant information.

34 Claims, 14 Drawing Sheets

U.S. PATENT DOCUMENTS

| | | |
|---|---|---|
| 7,185,256 B2 | 2/2007 | Miki et al. |
| 7,197,021 B2 | 3/2007 | Seo |
| 2002/0060997 A1* | 5/2002 | Hwang ................ 370/335 |
| 2003/0039218 A1 | 2/2003 | Kwak |
| 2004/0153909 A1* | 8/2004 | Lim et al. ............ 714/714 |
| 2005/0030911 A1 | 2/2005 | Tiedemann, Jr. et al. |
| 2005/0163161 A1 | 7/2005 | Wei et al. |
| 2007/0011553 A1* | 1/2007 | Altahan et al. ........ 714/746 |

FOREIGN PATENT DOCUMENTS

| | | |
|---|---|---|
| EP | 1326361 | 7/2003 |
| GB | 2357017 | 6/2001 |
| JP | 60-041832 | 3/1985 |
| JP | 2002-111637 | 4/2002 |
| WO | 9849797 | 11/1998 |
| WO | 0021236 | 4/2000 |
| WO | 0101624 | 1/2001 |
| WO | WO 02/03600 | 1/2002 |
| WO | 0233876 | 4/2002 |

OTHER PUBLICATIONS

T. Richardson et al.: Efficient encoding of low-density parity-check codes, IEEE Trans. Inform. Theory, vol. 47, No. 2, pp. 638-656, Feb. 2001.

Written Opinion-PCT/US2004/004831, International Search Authority-US-Apr. 13, 2006.

* cited by examiner

EFFICIENT AUTOMATIC REPEAT REQUEST METHODS AND APPARATUS

RELATED APPLICATIONS

This application claims the benefit of U.S. Provisional Application Ser. No. 60/448,667 filed on Feb. 19, 2003, titled "METHOD AND APPARATUS OF SUPPORTING EFFICIENT AUTOMATIC REPEAT REQUESTS (ARQ) IN A MULTIPLE ACCESS WIRELESS COMMUNICATION SYSTEM".

FIELD OF THE INVENTION

The present invention is directed to improved methods of communicating in a wireless communications system and more specifically to improved methods of automatic repeat requests in a multiple access wireless communications system.

BACKGROUND

Cellular communications systems are becoming ever more common. In cellular systems, a communications area is divided into a plurality of cells. Each cell normally includes at least one base station. The base station in each cell communicates with a plurality of devices, e.g., mobile terminals, located within the same cell as the base station. The base station usually serves as a mobile terminal's point of attachment to a communications network which includes the base station. Since access to the communications network is obtained by a mobile terminal through the base station to which it is coupled, e.g., by a wireless link, base stations are sometimes known as access nodes.

In cellular wireless data communication systems, data is often transported between a base station and a mobile terminal via a quantum of resource called a traffic segment. In such systems, the available resource for data communication in a cell, e.g., a traffic channel, is often partitioned into multiple traffic segments. Control information may be transmitted via other channels, e.g., acknowledgment channels. Downlink traffic segments transport data traffic from a base station to one or more wireless terminals, while uplink traffic segments transport data traffic from one or more wireless terminals to a base station.

Acknowledgment channels include acknowledgment segments which can be used to indicate whether or not information in one or more corresponding traffic segments was successfully received. An uplink acknowledgment channel can be used by a mobile device to signal that information transmitted by the base station was successfully received, e.g., was able to be decoded by the mobile terminal. This may be achieved by sending an Acknowledgement (Ack) in a segment of the uplink acknowledgment channel. Failure to successfully receive information may be communicated by sending a negative acknowledgement (NAK) instead of an ACK. The ACK and NAK can be represented using a single bit, e.g., a 1 to represent an ACK and a 0 to represent a NAK. A downlink acknowledgment channel can be used by a base station to signal whether or not information transmitted by the mobile in an uplink traffic channel was successfully received, e.g., was able to be decoded by, the base station in the same manner that the uplink acknowledgment channel is used by the mobile terminals. The transmitter, e.g. base station or mobile terminal, upon receiving a NAK can choose to retransmit the same data.

The retransmission of the previously transmitted information represents the transmission of redundant information. While retransmission can lead to improved transmission success, it can be a relatively costly process since transmission resources are consumed by the need to transmit the same data multiple times. The selective retransmission process can also lead to delays in achieving a successful transmission result.

The mechanism by which a determination is made as to whether or not redundant information, e.g., previously transmitted information, needs to be transmitted is sometimes called an automatic repeat request (ARQ) mechanism.

In order to increase error resiliency and reduce the need for the retransmission of data, error correction coding may be used. Error correction codes (ECCs) result in the addition of redundant information, e.g., one or more ECCs, being added in a selective manner to the transmitted information. By using the redundant information, it may be possible to recover transmitted information even when some errors occur during the transmission process.

In order to provide efficient utilization of communication bandwidth, it is generally desirable to minimize the amount of redundant information, e.g., error correction codes, transmitted along with the information to be communicated. As a result, even when error correction coding techniques are used, as a result of transmission errors, there may still remain a need for an ARQ mechanism.

In view of the above discussion, it should be appreciated that improved ARQ mechanisms and methods of communicating redundant information to increase the efficient utilization of limited amounts of bandwidth available to communicate data are both needed and desired.

SUMMARY OF THE INVENTION

The methods and apparatus of the present invention are directed to techniques which may be used in combination with error correction codes, to minimize the amount of redundant information that needs to be re-transmitted, e.g., in the event of communications errors. The invention is also directed to new and novel automatic repeat request (ARQ) mechanisms and methods of implementing such mechanisms. Improved ARQ mechanisms which can be used with Low Density Parity Check Codes (LDPCs), which differ from, and offer various advantages over, other well known error correction codes including Reed-Solomon codes are described and used in various embodiments.

Methods and apparatus of the invention use NAK (negative acknowledgement) signals that are transmitted to indicate a transmission failure, e.g., uncorrectable errors in a decoded signal and/or an unsatisfactory level of reliability with regard to decoded information. An unsatisfactory level of reliability may be determined from one or more reliability statistics maintained by a decoder, e.g., a count of uncorrectable error and/or soft information values.

In cases where decoding is successful, an ACK (acknowledgment) signal is transmitted to the device from which the successfully decoded signal was received.

In accordance with the present invention, NAK signals may assume any of a plurality of values, e.g., values in a set of pre-selected values or a value in a range of continuous values. The value of a NAK signal is used to convey information useful in determining the amount of redundant information that should be transmitted to facilitate decoding of the originally transmitted information signal. The NAK signal value may be determined, in accordance with the present invention, based on decoder error statistics, e.g., a count of detected errors in a decoded signal or other information, such as soft information values indicative of the reliability of decoded values generated from the transmitted signal as part of a decoding process. Such statistics provide a measure of the decoding success, e.g., fewer unrecoverable errors indicate greater decoding success than a larger number of unrecoverable errors. Since decoding error rates are a function of the quality of the received encoded signal, the NAK signal values generated in accordance with the invention are indicative of the received encoded signal quality.

As part of the encoding process used in various embodiments of the present invention, an encoded information signal is generated along with a set of redundant information, e.g., additional error correction bits which need not be transmitted with the original encoded information signal. In some cases, the original encoded information signal includes some error correction bits but this number is usually far smaller, e.g., less than half, the number of error correction bits included in the set of redundant information which is not transmitted with the encoded information signal. The redundant information is stored for a period of time after transmission of the encoded information signal, e.g., in the event a NAK is received. In the case where an ACK is received, the redundant information bits can, and normally are, discarded without being transmitted.

The device which transmitted the original encoded information signal, determines from the value of a received NAK signal the amount of redundant information that should be transmitted to facilitate decoding of the original information signal. Different amounts of redundant information will normally be selected for different NAK signal values. This provides an efficient repeat mechanism which avoids the need to send a fixed amount of redundant information regardless of the quality of the received signal which could not be decoded. By varying the amount of redundant information to reflect the relative level of decoding success, transmission efficiencies can be achieved without the need, in most cases, to retransmit the entire original signal.

In some cases, e.g., where a continues range of NAK signal values are supported, the granularity of the transmitted NAK signals may be finer than the granularity at which different amounts of redundant information are selected for transmission. Accordingly, in such cases multiple NAK signal values may correspond to the same size portion of redundant information but at least some NAK signal values will correspond to different sized portions of redundant information.

The selected portion of redundant information is transmitted following receipt of a NAK signal. The device receiving the redundant information uses it in combination with information obtained from the original received signal in an attempt to successfully decode the previously received signal.

Successful decoding of the previously received signal through use of the redundant information results in an ACK being transmitted in response to receiving the redundant information. However, if the device receiving the redundant information is still unable to successfully decode the received information a NAK is transmitted in response to receiving the redundant information. The value of the NAK is selected to indicate the current level of decoding success. Thus, the NAK transmitted in response to receiving redundant information will normally be a different value than the NAK transmitted in response to the original received signal due to a greater level of decoding success achieved through the use of the redundant information.

In various embodiments information signals are transmitted using traffic channel segments. Each traffic channel segment has a fixed data capacity. In cases where the redundant information transmitted in response to a NAK does not require the full capacity of the channel segment being used to communicate the redundant information, additional information intended for the device to which the redundant information is directed may be included in the signal used to communicate the redundant information.

In some embodiments, assignment information, which indicates assignment of a traffic channel segment for use by a particular device, is broadcast in an assignment message. Assignment messages in accordance with the invention may include information indicating whether the corresponding traffic segment will be used to communicate new information or redundant information. In the case where redundant information will be communicated, the assignment message may also include information sufficient to identify the previously transmitted signal to which the redundant information to be transmitted will correspond. This information may be, e.g., information identifying the previous traffic channel segment in which the original encoded information to which the redundant information corresponds.

The multi-level NAK and retransmission methods of the present invention are well suited to a wide range of encoding and transmission methods. Low Density Parity Check (LDPC) encoding methods are particularly well suited for use in accordance with the invention since such encoding methods allow for the generation of redundant information at the time of encoding which may be used to increase the chances of successful decoding and/or the reliability of decoded information but, assuming no transmission errors, need not be used to achieve successful decoding. LDPC decoding methods also have the advantage of providing useful decoding statistics that can, and are, used in various embodiments, to measure the level of decoding success.

While assignment messages and LDPC coding techniques are used in various embodiments of the invention, it should be appreciated that the multi-level NAK methods of the present invention and selection of different amounts of redundant information to transmit in response to a NAK signal are well suited for a wide range of applications which do not use assignment messages or LDPC codes.

Numerous additional features, benefits and embodiments of the present are discussed in the detailed description which follows.

DETAILED DESCRIPTION

Figure 1:
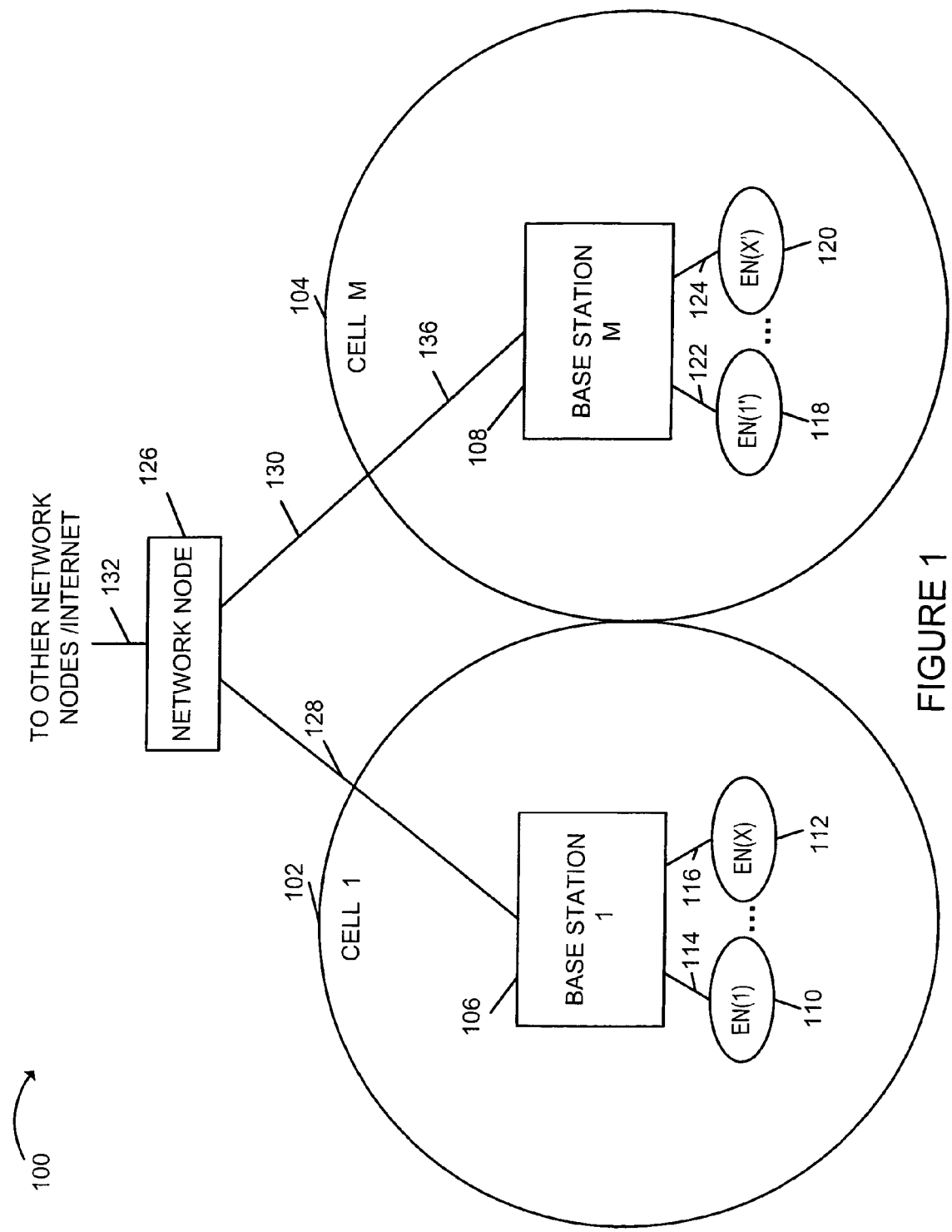
FIG. 1 illustrates an exemplary communications system implemented in accordance with and using methods of the present invention.

The method and apparatus of the present invention are well suited for cellular communications systems but are not limited in terms of applicability to such systems. Cellular systems in which the invention may be used normally include multiple cells with each cell including at least one base station and a plurality of wireless terminals, e.g., mobile nodes. FIG. 1 illustrates an exemplary wireless communications system 100 implemented in accordance with and using the methods of the present invention. Exemplary wireless communications system 100 supports efficient automatic repeat requests (ARQ) in accordance with the present invention. Exemplary wireless communications system 100 is a spread spectrum OFDM (orthogonal frequency division multiplexing) multiple-access system. While an exemplary OFDM wireless communications system is used in this application for purposes of explaining the invention, the invention is broader in scope than the example, and the invention can be applied in many other communication systems, e.g. a CDMA wireless communications system.

System 100 includes a plurality of cells: cell 1 102, cell M 104. Each cell (cell 1 102, cell M 104) includes a base station (BS), (BS 1 106, BS M 108), respectively, and represents the wireless coverage area of the base station. BS 1 106 is coupled to a plurality of end nodes, (EN(1) 110, EN(X) 112) via wireless links (114, 116), respectively. BS M 108 is coupled to a plurality of end nodes, (EN(1') 118, EN(X') 120) via wireless links (122, 124), respectively. The end nodes 110, 112, 118, 120 may be mobile and/or stationary wireless communications devices and are referred to as wireless terminals (WTs). Mobile WTs are sometimes referred to as mobile nodes (MNs). MNs may move throughout system 100. BS 1 106 and BS M 108 are coupled to network node 126 via network links 128, 130, respectively. Network node 126 is coupled to other network nodes and the Internet via network link 132. Network links 128, 130, 132 may be, e.g., fiber optic cables.

Figure 2:
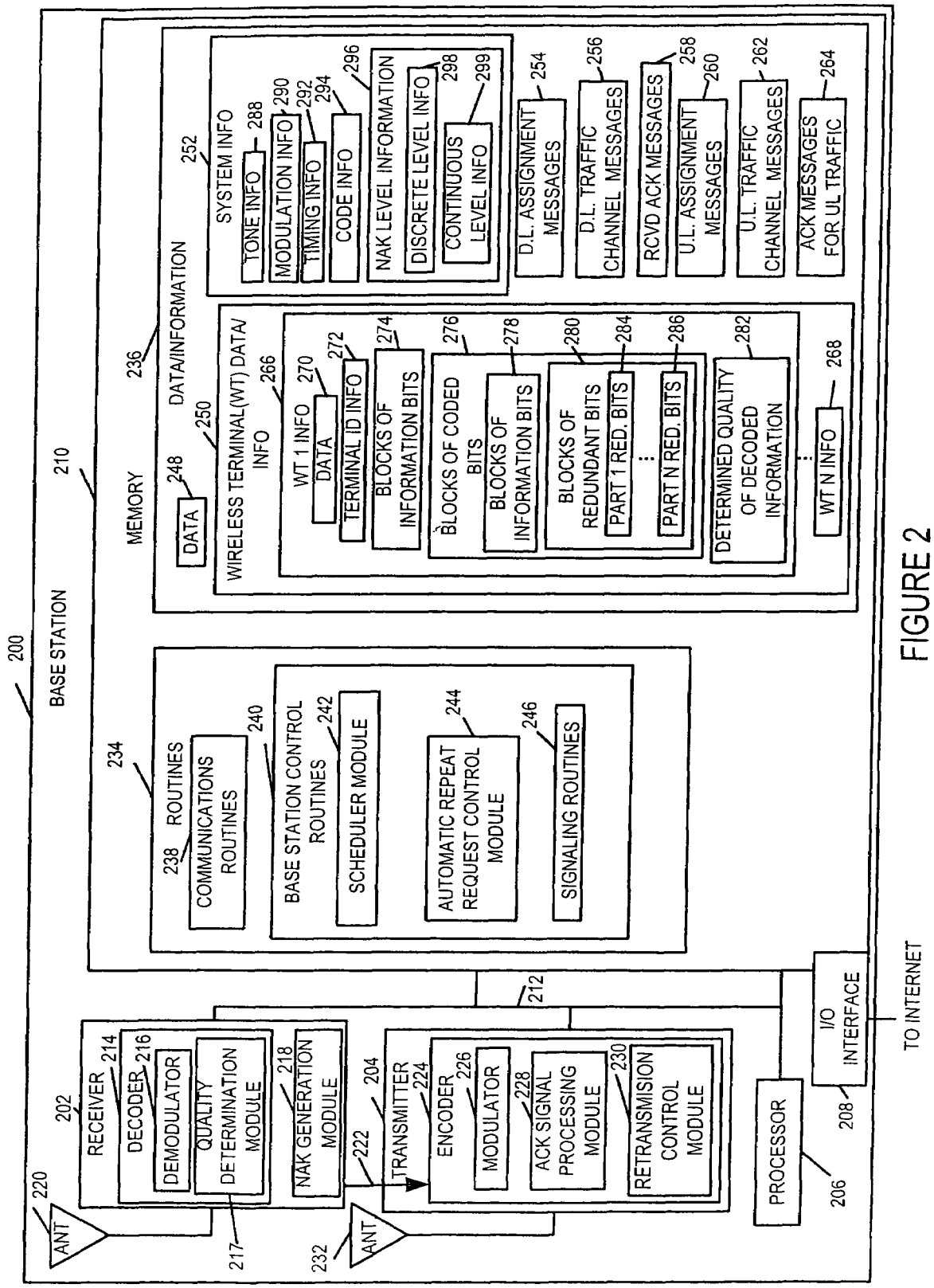
FIG. 2 is an illustration of an exemplary base station implemented in accordance with the present invention.

FIG. 2 is an illustration of an exemplary base station 200 implemented in accordance with the invention. Exemplary base station 200 may be a more detailed representation of any of the base stations 106, 108 of FIG. 1. Base station 200 includes a receiver 202, a transmitter 204, a processor 206, an I/O interface 208, and a memory 210 coupled together via bus 212 over which the various elements may interchange data and information.

Receiver 202 includes a decoder 214 and a NAK generation module 218. The decoder 214 includes a demodulator 216 and a quality determination module 217. The receiver 202 is coupled to an antenna 220 over which BS 200 can receive signals, e.g., uplink signals from WTs 300 (see FIG. 3), including acknowledgement channel signals and uplink traffic channels signals including data. Decoder 214, e.g., a LDPC decoder performs decoding operations of received signals, in accordance with the present invention. Demodulator 216 performs demodulation operations on received signals in accordance with the present invention. Quality determination module 217 generates and maintains decoding statistical information indicating the quality of the decoded signal, e.g., a measure of count, number, and/or level of detected errors and/or statistics on the reliability of the decoded signal such as soft information values. NAK generation module 218 generates a NAK, in accordance with the present invention, when a received signal, e.g., received data, cannot be decoded successfully. The receiver 202 is coupled to the transmitter 204 via link 222 over which a generated NAK may be communicated for subsequent transmission by transmitter 204 to a WT 300.

Transmitter 204 includes an encoder 224. The encoder 224, e.g., a LDPC encoder, includes a modulator 226, an acknowledgement signal processing module 228, and a retransmission control module 230. Operations of encoder 224 include encoding blocks of information bits into blocks of coded bits. Modulator 226 modulates information into signals, e.g., downlink assignment signals, downlink traffic signals, and acknowledgement signals. Transmitter 204 is coupled to antenna 232 through which downlink signals may be transmitted to WTs 300. Acknowledgement signal processing module 228 processes acknowledgement signal information, e.g., a received NAK signal from a WT 300 corresponding to a previous downlink traffic channel transmission which was not successfully decoded by the WT 300. Such processing may include obtaining a level of the received NAK, in accordance with the invention. Retransmission control module 230 controls the transmission of redundant information, e.g., blocks of redundant bits, to WT 300, in accordance with the invention. Retransmission control module 230 may perform control in response to information from the acknowledgement signal processing module 228. Retransmission control may include controlling the number and/or size of redundant block to be transmitted, controlling whether to retransmit the block of information bits, and/or controlling whether to abort further transmissions related to a coded block.

Memory 210 includes routines 234 and data/information 236. Processor 206, e.g., a CPU, executes the routines 234 and uses the data/information 236 in memory 210 to control the operation of the base station 200 and implement the methods of the present invention. I/O interface 208 couples BS 200 to other network nodes, e.g., routers, other bases station, AAA server nodes, etc., and the Internet. I/O interface 208 allows WTs 300 operating within the cell of BS 200 to communicate with peer nodes outside the cellular coverage area of BS 200.

Routines 234 include communications routines 238 and base station control routines 240. Base station control routines 240 include a scheduler module 242, an automatic repeat request control module 244, and signaling routines 246. Communications routines 238 are used for controlling base station 200 to perform various communications operations and implement various communications protocols. Base station control routines 240 is used to control base station 200 operations, e.g., I/O interface 208 control, receiver 202 control, transmitter 204 control, power control, scheduling, ARQ control, signaling, etc., and to implement the steps of the method of the present invention. The scheduler module 242 is used to control transmission scheduling and/or communication resource allocation. The scheduler module 242 may serve as a scheduler. Scheduler module 242 may schedule users, e.g., WTs 300 to channel segments, e.g., uplink traffic channel segments and downlink traffic channel segments.

Automatic repeat request control module 244 uses the data/information 236 in memory 210 and works in conjunction with the receiver 202, and transmitter 204 to control the operation of ARQ, in accordance with the present invention. Signaling routines 246 performs operation to control signal generation, signal transmission, and signal reception over the wireless interface, e.g., through antenna 220, 232, and through I/O interface 208.

Data/information 236 includes data 248, wireless terminal (WT) data/information 250, system information 252, downlink assignment messages 254, downlink traffic messages 256, received acknowledgement messages 258, uplink assignment messages 260, uplink traffic channel messages 262, and acknowledgement messages for uplink traffic 264.

Data 248 includes user data, e.g., data received from WTs 300 over wireless links, data received from other network nodes, data to be transmitted to WTs 300, and data to be transmitted to other network nodes.

Wireless terminal data/information 266 includes a plurality of WT data/information, WT 1 information 266, WT N information 268. WT 1 information 266 includes data 270, terminal ID information 272, blocks of information bits 274, blocks of coded bits 276, and determined quality of decoded information 282. Data 270 includes user data received by BS 200 from WT 1 intended for a peer node of WT 1, e.g., WT N, and user data intended to be transmitted from BS 200 to WT 1. Terminal identification (ID) information 272 includes a base station assigned ID used to identify WT 1 in communications and operations with BS 200. Blocks of information bits 274 include blocks of information, e.g., blocks of user data bits, to be encoded by encoder 224 of transmitter 204. Blocks of coded bits 276 include blocks of information bits 278 and blocks of redundant bits 280. For each encoded block of information bits there is usually a corresponding block of redundant bits. The block of encoded bits is usually tranmitted while one or more portions of the redundant bits are transmitted in the event of a NAK. Blocks of encoded information bits 276 can include some redundant information, e.g., ECC bits, generates as part of the encoding process. Blocks of coded bits 276 are output from an encoding operation, e.g., an LDPC encoding operation, performed by encoder 224 on blocks of information bits 274. Blocks of information bits 276 may, and normally do, include the information, e.g., text, voice or other data, included in input blocks of information bits 274. They may also include some redundant information generated as part of the encoding process. The blocks of redundant bits 280 include additional redundant information, e.g., error correction coding additional bits. The blocks of redundant bits 280 include a plurality of groups of redundant bits, part 1 redundant bits 284 through part N redundant bits 286 for each block of coded information bits 278. For transmission purposes, an encoded block 278 of information bits may be grouped with a corresponding first portion 284 and transmitted as a set of encoded information. The remaining portions of redundant bits corresponding to the transmitted block of coded bits 278 can be stored as a set of redundant information which is accessed and used in the event of a NAK but which may be discarded upon receiving an ACK indicating successful receipt and decoding of the corresponding transmitted block of coded information bits 278. Determined quality of decoded information 282 is an output from the decoder 214 indicative of the quality level of the decoded information and thus the level of decoding success. NAK generation module 218 compares the determined quality of decoded information 282 to information included in NAK level information 296 to determine whether decoding was successful or not. Thus, module 218 determines if a NAK should be generated and, if so, the appropriate level NAK to generate as a function of the level of decoding success when the decoding is not fully successful.

System information 252 includes tone information 288, modulation information 290, timing information 292, code information 294, and NAK level information 296. Tone information 288 includes information identifying tones used in hopping sequences, channels, and/or segments. Modulation information 290 includes information used by BS 200 to implement various modulation schemes used by the modulator 216 and demodulator 226. Timing information 292 may include timing information used for hopping sequences, superslots, dwells, duration of channel segments, and timing relationships between different channel segments, e.g., a timing relationship between an assignment segment, a traffic channel segment, and an acknowledgement channel segment. Timing information 292 may also include timing information used in the ARQ methods of the present invention. Code information 294 includes information identifying coding rates, the type of code used, e.g., a LDPC, ECC related information used in generation of coded information, and ECC related information used in recovery of coded information. NAK level information 296 includes discrete level information 298 and continuous level information 299. NAK level information 296 includes information that may be used by NAK generation module 218 to generate NAKs, in accordance with the invention, for subsequent transmission to a WT 300. NAK level information 296 also includes information that may be used by ACK signal processing module 228 to interpret and process received NAK signals from WTs 300. Discrete level information 298 includes information defining and relating to discrete levels of NAKs, used in some embodiments of the invention. Discrete level information 298 may include a plurality of NAK signal values, each possible NAK signal values corresponding to a different level of encoded signal quality, a phase value corresponding to ACK, and different phase values corresponding to each of the different NAK levels. Continuous level information 299 includes information defining and relating to continuous levels of NAK signal values, used in some embodiments of the invention. Continuous level information 299 includes a continuous range of NAK signal values corresponding to a continuous interval of NAK phase, a phase value corresponding to an ACK, an interval of requested bits corresponding to and mapped from the continuous range of phase of NAK signals.

Downlink assignment messages 254 include assignment messages used to notify a WT 300 that it has been assigned a downlink traffic channel segment. Downlink assignment messages 254 may include a new/old bit indicator used to convey whether the corresponding downlink traffic segment is or is not a first time traffic segment. The downlink assignment messages 254 may also include information indicating the ID of the intended WT, for a first time traffic segment, or information used to obtain the index of the first time segment, for a non—first time segment. Downlink assignment messages 254 are transmitted by BS 200 to WTs 300 on downlink assignment segments.

Downlink traffic channel messages 256 include data and information, e.g., blocks of information bits 274, coded and then transmitted from BS 200 to WT 300 on downlink traffic channel segments. Received acknowledgement messages 258 include acknowledgement signals from WTs 300 to BS 200 indicating whether or not a WT 300 has successfully decoded the transmitted information, e.g., an acknowledgement signal conveying information in the phase identifying the positive acknowledgement (ACK) or a level of negative acknowledgement (NAK), where the level of negative acknowledgement may be used to determine the retransmission, e.g., amount of redundant bits to be subsequently sent, in accordance with the invention.

Uplink assignment messages 260 include assignment messages used to notify a WT 300 that it has been assigned an uplink traffic channel segment. Uplink assignment messages 260 may include a new/old bit indicator used to convey whether the corresponding uplink traffic segment is or is not a first time traffic segment. The uplink assignment messages 260 may also include information indicating the ID of the intended WT, for a first time traffic segment, or information used to obtain the index of the first time segment, for a non-first time segment. Uplink assignment messages 262 are transmitted by BS 200 to WTs 300 on uplink assignment segments.

Uplink traffic channel messages 262 include received data and information that has been successfully decoded from coded signals transmitted on uplink traffic channel segments by WT 300 to BS 200. Acknowledgement messages for uplink traffic 264 include acknowledgement messages generated by NAK generation module 218 based upon the quality of the decoded information, e.g., an ACK message for a successful recovery of information and messages corresponding to various levels of NAKs for an unsuccessful decoding attempt in accordance with the present invention.

Figure 3:
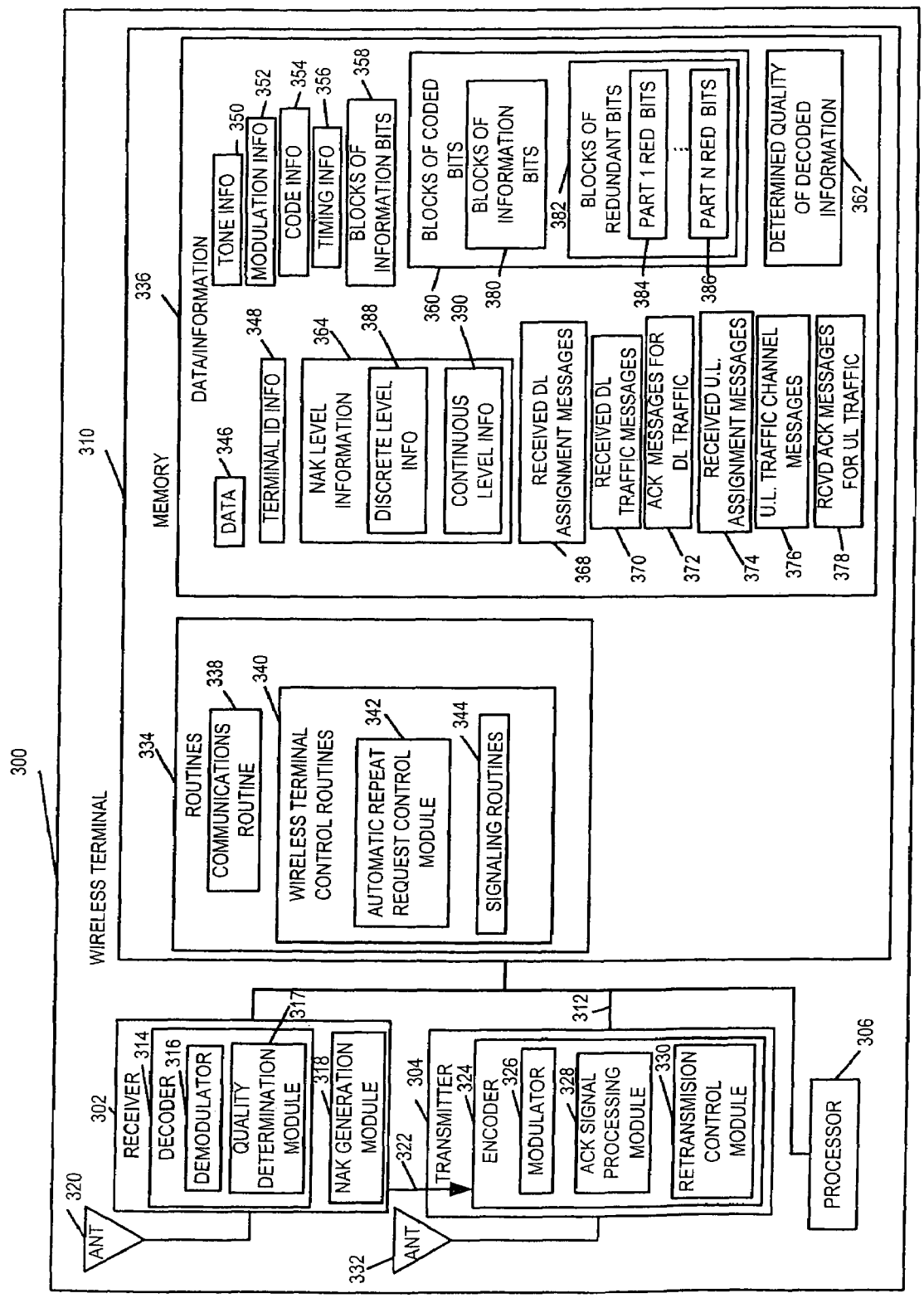
FIG. 3 is an illustration of an exemplary wireless terminal implemented in accordance with the present invention.

FIG. 3 is an illustration of an exemplary wireless terminal 300 implemented in accordance with the invention. Exemplary wireless terminal 300 may be a more detailed representation of any of the end nodes 110, 112, 118, 120 of FIG. 1. Wireless terminal 300 includes a receiver 302, a transmitter 304, a processor 306, and a memory 310 coupled together via bus 312 over which the various elements may interchange data and information.

Receiver 302 includes a decoder 314 and a NAK generation module 318. The decoder 314 includes a demodulator 316 and a quality determination module 317. The receiver 302 is coupled to an antenna 320 over which WT 300 can receive signals, e.g., downlink signals from BS 200, including assignment channel signals, acknowledgement channel signals and downlink traffic channels signals including data. Decoder 314, e.g., a LDPC decoder, performs decoding operations of received signals, in accordance with the present invention. Demodulator 316 performs demodulation operations on received signals in accordance with the present invention. Quality determination module 317 generates and maintains decoding statistical information indicating the quality of the decoded signal, e.g., a measure of count, number, and/or level of detected errors and/or statistics on the reliability of the decoded signal such as soft information values. NAK generation module 318 generates a NAK, in accordance with the present invention, when a received signal, e.g., received data, cannot be decoded successfully. The receiver 302 is coupled to the transmitter 304 via link 322 over which a generated NAK may be communicated for subsequent transmission by transmitter 304 to BS 200.

Transmitter 304 includes an encoder 324. The encoder 324, e.g., a LDPC encoder, includes a modulator 326, an acknowledgement signal processing module 328, and a retransmission control module 330. Operations of encoder 324 include encoding blocks of information bits into blocks of coded bits. Modulator 326 modulates information into signals, e.g., uplink traffic signals, and acknowledgement signals. Transmitter 304 is coupled to antenna 332 through which uplink signals may be transmitted to BS 200. Acknowledgement signal processing module 328 processes acknowledgement signal information, e.g., a received NAK signal from BS 200 corresponding to a previous uplink traffic channel transmission which was not successfully decoded by the BS 200. Such processing may include obtaining a level of the received NAK, in accordance with the invention. Retransmission control module 330 controls the transmission of redundant information, e.g., blocks of redundant bits, to BS 200, in accordance with the invention. Retransmission control module 330 may perform control in response to information from the acknowledgement signal processing module 328. Retransmission control may include controlling the number and/or size of redundant block to be transmitted, controlling whether to retransmit the block of information bits, and/or controlling whether to abort further transmissions related to a coded block.

Memory 310 includes routines 334 and data/information 336. Processor 306, e.g., a CPU, executes the routines 334 and uses the data/information 336 in memory 310 to control the operation of the wireless terminal 300 and implement the methods of the present invention.

Routines 334 include communications routine 338 and wireless terminal control routines 340. Wireless terminal control routines 340 include an automatic repeat request control module 342, and signaling routines 344. Communications routine 338 is used for controlling wireless terminal 300 to perform various communications operations and implement various communications protocols. Wireless terminal control routines 340 is used to control wireless terminal 300 operations, e.g., receiver 302 control, transmitter 304 control, power control, ARQ control, signaling, etc., and to implement the steps of the method of the present invention.

Automatic repeat request control module 342 uses the data/information 336 in memory 310 and works in conjunction with the receiver 302, and transmitter 304 to control the operation of ARQ, in accordance with the present invention. Signaling routines 344 performs operation to control signal generation, signal transmission, and signal reception over the wireless interface, e.g., through antennas 320 and 332.

Data/information 336 includes data 346, terminal ID information 348, tone information 350, modulation information 352, code information 354, timing information 356, blocks of information bits 358, blocks of coded bits 360, determined quality of decoded information 362, NAK level information 364, received downlink assignment messages 368, received downlink traffic messages 370, acknowledgement messages for downlink traffic 372, received uplink assignment messages 374, uplink traffic channel messages 376, and received acknowledgement messages for uplink traffic 378.

Data 346 includes user data received by WT 300 from BS 200, e.g., data from a communications peer node of WT 300, and user data intended to be transmitted to BS 200 from WT 300. Terminal identification (ID) information 348 includes a base station assigned ID used to identify WT 300 in communications and operations with BS 200. Blocks of information bits 358 include blocks of information, e.g., blocks of user data bits, to be encoded by encoder 324 of transmitter 304. Blocks of coded bits 360 include blocks of information bits 380 and blocks of redundant bits 382. Blocks of coded bits 360 may be the output from the encoding operation, e.g., an LDPC encoding operation performed by encoder 324 on blocks of information bits 358. Blocks of information bits 380 include the information included in input blocks of information bits 358. The blocks of redundant bits 382 include additional redundant information, e.g., error correction coding additional bits. The blocks of redundant bits 382 include a plurality of blocks of redundant bits, part 1 redundant bits 384, part N redundant bits 386. Determined quality of decoded information 362 is an output from the decoder 314 indicative of the quality level of the decoded information. NAK generation module 318 may compare the determined quality of decoded information 362 to information included in NAK level information 364 to determine whether a NAK should be generated and/or to determine the appropriate level NAK to generate.

Tone information 350 includes information identifying tones used in hopping sequences, channels, and/or segments. Modulation information 352 includes information used by WT 300 to implement various modulation schemes used by the demodulator 316 and modulator 326. Timing information 356 may include timing information used for hopping sequences, superslots, dwells, duration of channel segments, and timing relationships between different channel segments, e.g., a timing relationship between an assignment segments, a traffic channel segment, and an acknowledgement channel segment. Timing information 356 may also include timing information used in the ARQ methods of the present invention. Code information 354 includes information identifying coding rates, the type of code used, e.g., a LDPC, ECC related information used in generation of coded information, and ECC related information used in recovery of coded information. NAK level information 364 includes discrete level information 388 and continuous level information 390. NAK level information 364 includes information that may be used by NAK generation module 318 to generate NAKs, in accordance with the invention, for subsequent transmission to BS 200. NAK level information 364 also includes information that may be used by ACK signal processing module 328 to interpret and process received NAK signals from BS 200. Discrete level information 388 includes information defining and relating to discrete levels of NAKs, used in some embodiments of the invention. Discrete level information 388 may include a plurality of NAK signal values, each possible NAK signal values corresponding to a different level of encoded signal quality, a phase value corresponding to an ACK, and different phase values corresponding to each of the different NAK levels. Continuous level information 390 includes information defining and relating to continuous levels of NAK signal values, used in some embodiments of the invention. Continuous level information 390 includes a continuous range of NAK signal values corresponding to a continuous interval of NAK phase, a phase value corresponding to an ACK, an interval of requested bits corresponding to and mapped from the continuous range of phase of NAK signals.

Received downlink assignment messages 368 include assignment messages used to notify WT 300 that it has been assigned a downlink traffic channel segment. Received downlink assignment messages 368 may include a new/old bit indicator used to convey whether the corresponding downlink traffic segment is or is not a first time traffic segment. The downlink assignment messages 368 may also include information indicating the ID of the intended WT, for a first time traffic segment, or information used to obtain the index of the first time segment, for a non-first time segment. Downlink assignment messages are transmitted by BS 200 to WTs 300 on downlink assignment segments.

Received downlink traffic channel messages 370 include data and information, e.g., blocks of information bits 358 that have been successfully decoded by decoder 314. Downlink traffic messages are transmitted from BS 200 to WT 300 on downlink traffic channel segments. Acknowledgement messages for downlink traffic 372 include messages transmitted in acknowledgement signals from WT 300 to BS 200 indicating whether or not WT 300 has successfully decoded the received information, e.g., an acknowledgement signal conveying information in its phase identifying a positive acknowledgement (ACK) or information in the phase identifying a level of negative acknowledgement (NAK), where the level of negative acknowledgement may be used to determine the retransmission, e.g., amount of redundant bits being requested to be subsequently sent, in accordance with the invention.

Received uplink assignment messages 374 include assignment messages used to notify a WT 300 that it has been assigned an uplink traffic channel segment. Received uplink assignment messages 374 may include a new/old bit indicator used to convey whether the corresponding uplink traffic segment is or is not a first time traffic segment. The uplink assignment messages 374 may also include information indicating the ID of the intended WT, for a first time traffic segment, or information used to obtain the index of the first time segment, for a non-first time segment. Uplink assignment messages are transmitted by BS 200 to WTs 300 on uplink assignment segments.

Uplink traffic channel messages 376 include data and information, e.g., blocks of information bits 358, that are encoded into blocks of coded bits, and transmitted in uplink signals on uplink traffic channel segments by WT 300 to BS 200.

Received acknowledgement messages for uplink traffic 378 include acknowledgement signals from BS 200 to WT 300 indicating whether or not BS 200 has successfully decoded the transmitted information, e.g., an acknowledgement signal conveying information in the phase identifying the positive acknowledgement (ACK) or a level of negative acknowledgement (NAK), where the level of negative acknowledgement may be used to determine the retransmission, e.g., amount of redundant bits requested to be subsequently sent, in accordance with the invention.

In one exemplary system, with a cell, traffic segments are dynamically shared among the wireless terminals 300 that are communicating with a base station 200 in the cell, e.g., cell 1 102. A scheduling function in the base station 200 assigns each uplink and downlink segment to one of the wireless, e.g., mobile, terminals 300 in the cell based on a number of criteria. The assignments are communicated over control resources called assignment segments. Corresponding to each traffic segment is a unique assignment segment that includes the identifier of the wireless terminal 300 to which the traffic segment is assigned. Data transmitted by the base station 200 on a downlink traffic segment is decoded by the intended terminal receiver. Data transmitted by the assigned wireless terminal 300 on the uplink segment is decoded by the base station 200. Typically the transmitted segment includes redundant bits, e.g., an error correction code, that helps the receiving device, e.g., base station 200 or wireless, e.g., mobile, terminal 300, determine if the data is decoded correctly. This is done because a wireless channel used to transmit the data between the base station 200 and wireless, e.g., mobile, terminal 300 may be unreliable and data traffic typically has high integrity requirement to be useful. The receiving device then provides feedback to the transmitter. The feedback indicates successful or unsuccessful decoding of the received traffic segment. Successful decoding of a received segment is indicated a by sending a positive acknowledgment, e.g., an ACK. Unsuccessful decoding of a segment is indicated by sending a negative acknowledgement, e.g., a NAK. The acknowledgement is sent using a control resource, e.g., a control channel comprising a plurality of acknowledgement segments. Each ACK or NAK may be transmitted in a different acknowledgment segment corresponding in a predetermined manner to one or more traffic channel segments. In one particular embodiment, a unique acknowledgement segment is associated with each traffic segment. The transmitter, upon receiving a NAK can choose to retransmit the same data or, in accordance with the present invention transmit redundant information representing supplemental error correction code information. Thus, the exemplary system of the present invention supports an automatic repeat request mechanism wherein redundant information, e.g., incremental LDPC information corresponding to previously transmitted data, may be transmitted in response to a received NAK.

Figure 4:
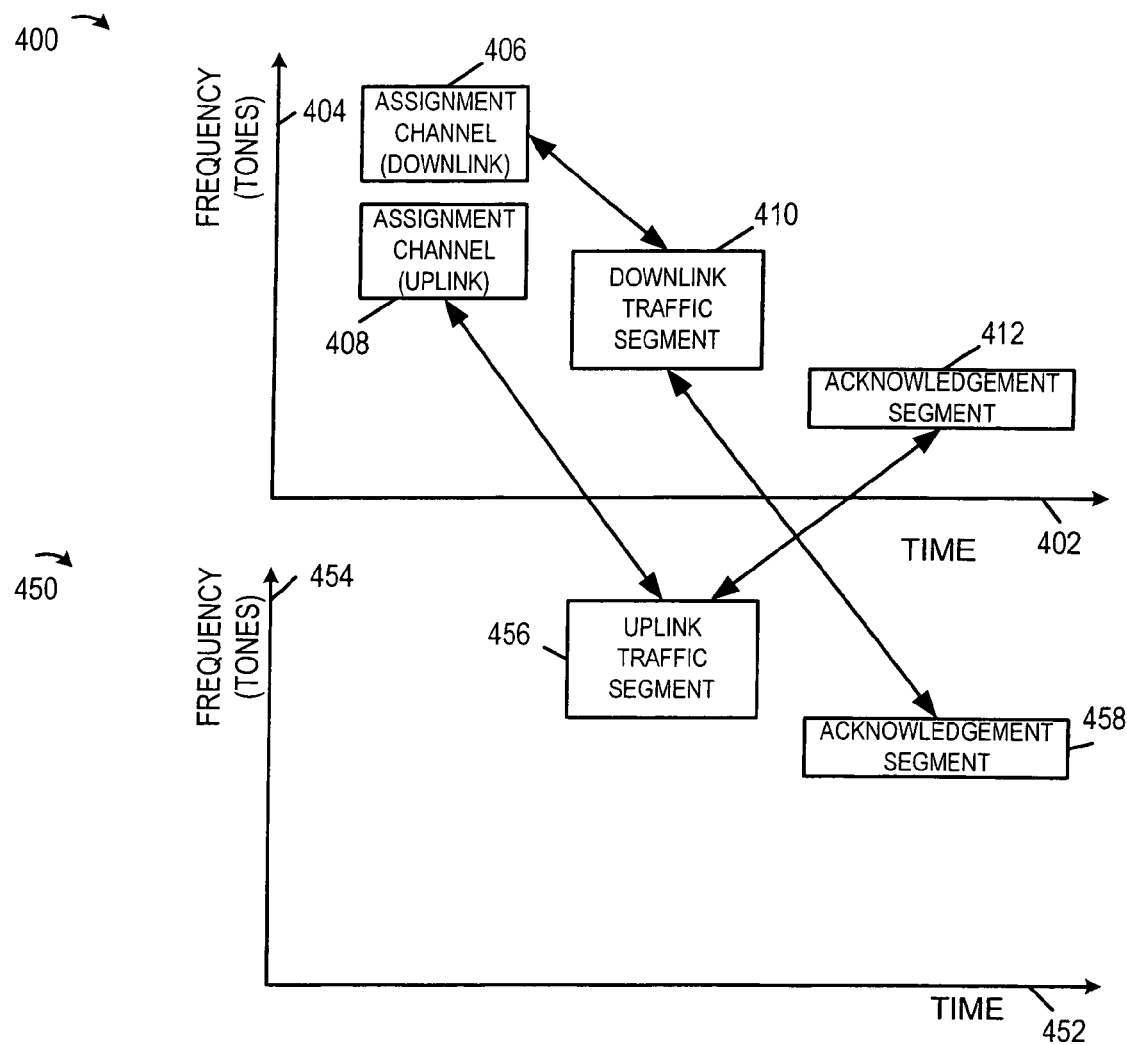
FIG. 4 is a drawing including diagrams illustrating exemplary downlink and exemplary uplink channels and is used to illustrate an exemplary method of allocating traffic channel segments, in accordance with the present invention.

FIG. 4 is used to illustrate one exemplary method which may be used for allocating data to be transmitted to traffic channel segments and the use of acknowledgment segments to convey acknowledgment information (ACKs or NAKs) corresponding to the data transmitted in the traffic channel segments.

FIG. 4 includes a diagram 400 of downlink channels in which the horizontal axis 402 represents time and the vertical axis 404 represents frequency, e.g., frequency tones. FIG. 4 also includes a diagram 450 of uplink channels in which the horizontal axis 452 represents time and the vertical axis 454 represents frequency, e.g., frequency tones. In FIG. 4, a traffic segment is logically represented as a rectangular block. Diagram 400 includes the following downlink channel segments: an assignment segment for a corresponding downlink traffic segment 406, an assignment segment for a corresponding uplink traffic segment 408, a downlink traffic segment 410, and an acknowledgement segment corresponding to an uplink traffic segment 412. Diagram 450 includes the following uplink channel segments: an uplink traffic channel segment 456 and an uplink acknowledgement segment 458. In a real system, the physical frequencies, e.g., tones, occupied by the traffic segment may not be contiguous, e.g., due to hopping or other reasons, and may vary over time. Each traffic channel segment may correspond to one or more tones. In addition, each traffic channel segment may last one or more time periods, e.g., symbol periods. FIG. 4 shows that there is an assignment channel in the downlink. The assignment channel includes a sequence of assignment segments 406. Each assignment segment 406, represented as a rectangular block, is used to transmit the assignment information of a particular downlink traffic segment 410. The assignment information includes the identifier of the wireless terminal(s) 300 which are to receive the data in the associated downlink traffic segment 410. In order to facilitate the receiver operation, the assignment information may also include such information as channel coding and modulation rates to be use to process the data in the corresponding downlink traffic segment 410. A downlink traffic segment 410 is associated with a corresponding assignment segment 406 in a prescribed, e.g., predetermined, known manner. Each uplink traffic segment 456, like each down link traffic segment 410, is assigned by the base station 200 scheduler to be used by one or more wireless, e.g., mobile, terminals 300. The assignment information is communicated using assignment segments 408 in the downlink having a predetermined relationship to the assigned uplink traffic segments 456. Since the relationship between assignment segments 406, 408 and traffic segments 410, 456 is predetermined and known, there is no need in the exemplary embodiment to include information in an assignment segment 406, 408 indicating the traffic channel segment (s) 410, 456 to which the assignment information in a particular assignment segment corresponds.

FIG. 4 shows that there is an acknowledgment channel in the uplink as in the downlink. The uplink acknowledgement channel includes a sequence of acknowledgement segments 458. An uplink acknowledgment segment 458 indicates whether the information in the associated downlink traffic segment 410 was received correctly or not, e.g., whether it was possible to correctly decode the information received in the corresponding traffic segment 410. The wireless terminal 300 that has been assigned the associated downlink traffic segment 410 transmits the acknowledgment in the corresponding uplink acknowledgement segment 458, while all the other wireless terminals do not typically transmit using that particular acknowledgment segment 458. The acknowledgment information can include as little as one bit, either an ACK, e.g., a "1", to indicate reception success, or NAK, e.g., a "0", to indicate reception failure. A downlink traffic segment 410 is associated with a corresponding uplink acknowledgment segment 458 in a prescribed, e.g., predetermined, manner. Similarly, there is a downlink acknowledgment channel in which the acknowledgement segments 412 include the acknowledgment information for the corresponding uplink traffic segments 456.

Cascaded codes, e.g., cascaded LDPC Codes, may be used, in accordance with the present invention, to provide the redundant information transmitted in response to receiving a NAK.

A downlink or uplink traffic segment is used to carry a block of information bits. In one embodiment of the invention, the block of information bits is encoded into a block of coded bits using channel coding methods, such as Low-Density Parity-Check (LDPC) coding, which is described for example in T. Richardson and R. Urbanke, "Efficient encoding of low-density parity-check codes," *IEEE Trans. Inform. Theory*, vol. 47, no. 2, pp. 638-656, February 2001 which is hereby expressly incorporated by reference.

The block of coded bits are then mapped into a set of constellation symbols, e.g., as part of a symbol mapping operation that may also be described as a modulation operation. The generated symbols are transmitted over a wireless channel. The receiving device performs a symbol recovery operation and then processes the recovered symbols to obtain the transmitted bits. The recovered block of coded bits is subject to a channel decoding operation, e.g., an LDPC decoding operation, in an attempt to recover the block of information bits subject to the LDPC encoding operation prior to transmission.

Channel coding adds redundancy to the transmitted signal in order to combat the corruption likely to occur during transmission over the wireless channel. Given a fixed modulation scheme, the larger the number of redundant bits added, the larger the amount of corruption the transmission can withstand while still decoding (recovering the information bits) correctly. When a block of information bits is to be transmitted for the first time in a traffic segment, the block of information bits are encoded into a codeword having some specific redundancy.

In one particular embodiment of the invention, the encoded bits transmitted in a first traffic segment represent a codeword of an LDPC code. LDPC codes are well suited to hybrid ARQ wherein additional redundant information in the form of correction code information is transmitted instead of retransmitting the originally transmitted information when a NAK is received.

Given an LDPC code, as represented using a Tanner graph, an extension of the code can be defined by introducing additional variable nodes and constraint nodes into the graph. In effect, the extension of the code includes parity checks of bits in the original codeword. In the particular embodiment in the Tanner graph, the additional parity check bits are represented as additional degree one variable nodes, each connected to a single additional constraint node. LDPC decoding proceeds by performing message-passing decoding on the extended graph. The additional parity checks, e.g., the graph extension, may be predefined in the form of an explicit structure or implicitly defined in the form of a random process which generates the extension keyed on some seed that is available to both the transmitter and the receiver.

In accordance with the invention, incremental redundant bits, transmitted in response to a NAK, extend the codeword of the first transmitted codeword (transmitted in a first traffic segment) to form a larger codeword which hopefully can be decoded successfully given the increased redundancy compared to the initial codeword. In one embodiment, additional parity check bits, formed by performing parity checks of the original information bits or the original LDPC codeword, comprise the incremental redundant bits. In another embodiment of the invention, the incremental bits include some/all of the information bits and/or some or all of the parity check bits transmitted in the first traffic segment, e.g., the first transmission of information bits to which the incremental bits correspond.

In accordance with one feature of the invention, when two traffic segments, e.g., first and second traffic segments, associated with the same information bits are NAKed, the transmitter may transmit incremental redundant bits in a third traffic segment, so that the receiver can combine the three received traffic segments to achieve better decoding performance. The incremental redundant bits are constructed similarly to those in the second traffic segment. The above procedure may repeat a number of times, e.g., N times, where N is a positive integer, until some termination criterion is met, e.g., decoding success is achieved. In some embodiments N is greater than 3, e.g., 4 or 5.

Figure 5:
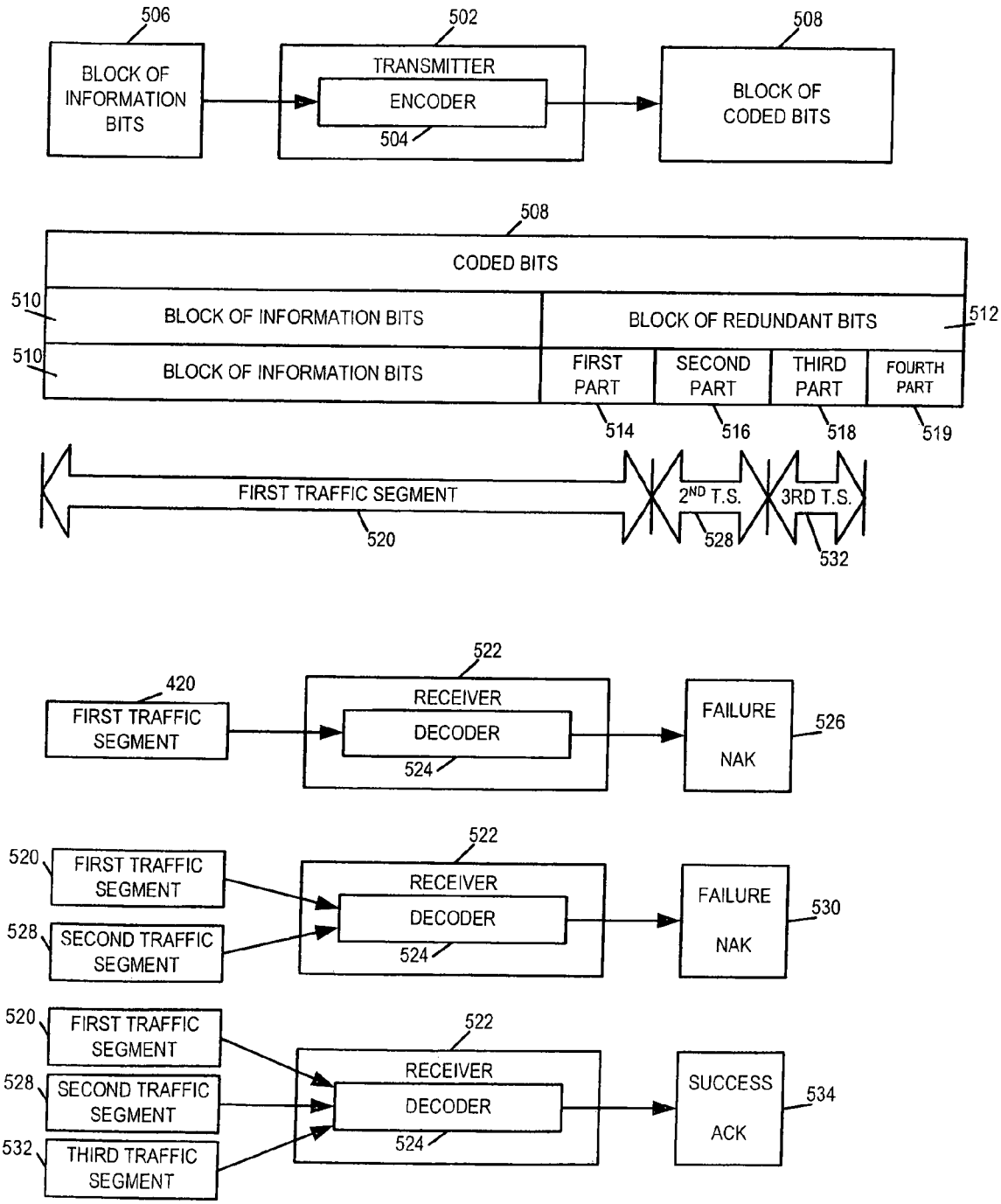
FIG. 5 illustrates an example of using incremental redundant codes, e.g., incremental redundant LDPC codes, in accordance with the present invention.

FIG. 5 illustrates an example of using incremental redundant codes, e.g., incremental redundant LDPC codes, in accordance with the invention. FIG. 5 includes a transmitter 502 including an encoder 504, implemented in accordance with the present invention. FIG. 5 also includes a receiver 522 including a decoder 524, implemented in accordance with the present invention. Transmitter 502 may be used as transmitter 204 of BS 200 of FIG. 2 or the transmitter 304 of WT 300 shown in FIG. 3. Receiver 522 may be used as the receiver 202 of BS 200 or receiver 302 of WT 300. When a block of information bits 506 is to be transmitted, the transmitter 502 with its encoder 504 uses a big parity check matrix to generate code bits 508 including a large block of parity check bits. Coded bits 508 include a block of information bits 510 and a block of redundant bits 512. The block of redundant bits 512 includes a first part 514, a second part 516, a third part 518, and a fourth part 519. In a first traffic segment 520, the information bits 510 and the first part of the parity check bits 514 are transmitted. The combination of the coded information bits 510 and the first part 514 of the parity check bits form a first set of encoded information which is transmitted. The remaining parity check bits, the second through fourth parity check bits, form a set of redundant information which is stored and used in the event of a NAK. If the receiver 522 with its decoder 524 cannot decode the information bits 510 and sends a NAK 526, the transmitter 502 sends the second part of the parity check bits 516 in a second traffic segment 528. The receiver 522 uses both the received segments 520, 528 in the decoding process in an attempt to decode the information bits 510. Now suppose that the receiver 522 still cannot decode the information bits 510 as evidenced by the receiving device 522 sending another NAK 530 in an acknowledgement segment corresponding to the second traffic segment 528. Then the transmitter 502 transmits the third part of the parity check bits 518 in a third traffic segment 532. The receiver 522 should use some or all of the received segments, e.g., segments 520, 528, 532, to decode the information bits 510. If the receiver 522 decodes the information bits 510 successfully at some time, then the transmitter may discard the unused parity check bits.

In the FIG. 5 example, the receiving device 522 is unable to decode the first and second traffic segments 520, 528 and responds to each of these segments with a NAK 526, 530, respectively. By combining the information ((510 and 514), (516)) received in the first and second traffic segments (520, 528) with the incremental information, e.g., incremental LDPC information, 518 received in the third traffic segment 532 the receiving device 522 is finally able to successfully decode the received information 510. This results in the receiving device 522 transmitting an ACK 534 in the acknowledgement segment corresponding to the third traffic segment 532. In response to the ACK 534, the transmitting device 502 is informed that it is not necessary to transmit additional redundant information, e.g., additional redundant bits, e.g., additional LDPC bits, 519.

In the above example, when multiple traffic segments 520, 528, 532 associated with the same information bits 510 are transmitted, the retransmission traffic segments 528, 532 include additional redundant, e.g., parity check, bits 516, 518 without the original information 510 transmitted in the first traffic segment 520.

In another embodiment of the invention, in addition to the additional redundant bits, a retransmission traffic segment can also include new information bits, e.g., bits which do not correspond to the codeword transmitted in a previous traffic segment. Thus, if the receiver is able to decode correctly the combined first-time transmission segment and the retransmission segment, the receiver effectively receives not only the information bits included in the first-time transmission segment, e.g., first traffic segment, but also the new information bits added in the retransmission segment, e.g., second or third traffic segment.

Incremental assignment in accordance with the present invention shall now be described in an exemplary embodiment. One feature of the present invention is directed to a method of traffic segment assignment that enables the use of incremental redundant coding, e.g., incremental redundant LDPC coding.

Consider the downlink traffic segments first. In various exemplary embodiments used to explain the invention, for each downlink traffic segment, there is a corresponding assignment segment, which indicates the assignment information of the downlink traffic segment. The association between a downlink traffic segment and the corresponding assignment segment is pre-determined and fixed.

In accordance with the invention, in some embodiments the assignment segment explicitly indicates whether the corresponding traffic segment is the first-time transmission or not.

If it is the first-time transmission, the assignment segment should include such information as the identifier of the wireless terminal(s).

If it is not the first-time transmission, in accordance with the invention, the assignment segment should include, e.g., in place of the identifier of wireless terminal, information that can link the previously transmitted traffic segments that are associated with the same block of information bits. Such information is called "incremental assignment" in this description. Given the incremental assignment, the receiver of the traffic segments can then combine those segments together and effectively decode the block of the information bits.

Figure 6:
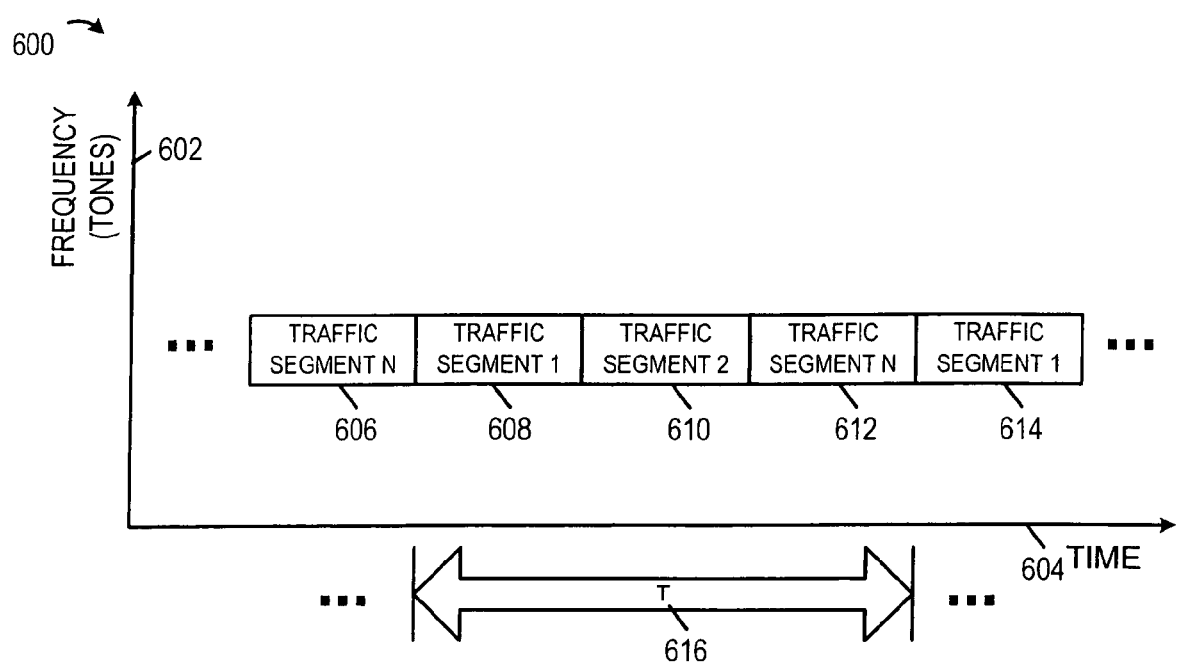
FIG. 6 is a diagram illustrating time windows and segment index within the time window, in accordance with the present invention.

In accordance with the invention, each of the traffic segments are uniquely indexed over a certain time interval, e.g., a periodic time interval. For example, FIG. 6 illustrates N traffic segments, indexed as 1, 2, ..., N, in a time interval T 616, where for purposes of illustration in the example, N=3. In general, the value of N is a number much larger than 3. FIG. 6 is a diagram 600 of frequency, e.g. frequency tone, on vertical axis 602 vs time on horizontal axis 604. The example of FIG. 6 shows each traffic segment occupying the same frequencies, but different time slots. FIG. 6 shows a traffic segment N 606, followed by a traffic segment 1 608, followed by a traffic segment 2 610, followed by a traffic segment N 612, followed by a traffic segment 1 614. Additional segments, in a time interval T 616, would be included in cases where N equals some number greater than 3. Any past traffic segment within the time window of T 616 can be uniquely identified by the segment index. The time interval T 616 is thus referred to as the valid time window. In accordance with one feature of the invention, the wireless terminal 300 stores the assigned traffic segments within the valid time window that have not been able to be decoded. The wireless terminal 300 also stores the past assignment information within the valid time window. This information is stored in the memory included in the wireless terminal 300.

Consider a traffic segment that represents the $n^{th}$ transmission associated with a block of information bits, where n>1. Some embodiments of incremental assignment are described below.

In one embodiment, the incremental assignment includes the index of the first-time traffic segment of the same block of information bits. In another embodiment, the incremental assignment includes the index of the $(n-1)^{th}$ segment transmission of the same block of information bits.

In yet another embodiment, the incremental assignment includes an index difference $\Delta$ ($\Delta>0$). Denote the index of the current traffic segment as I. For example, the incremental assignment can indicate that the first-time traffic segment of the same block of information bits is given as $(I-\Delta)$ mod N. In another example, the incremental assignment indicates that the $(n-1)^{th}$ segment transmission of the same block of information bits is given as $(I-\Delta)$ mod N.

Figure 7:
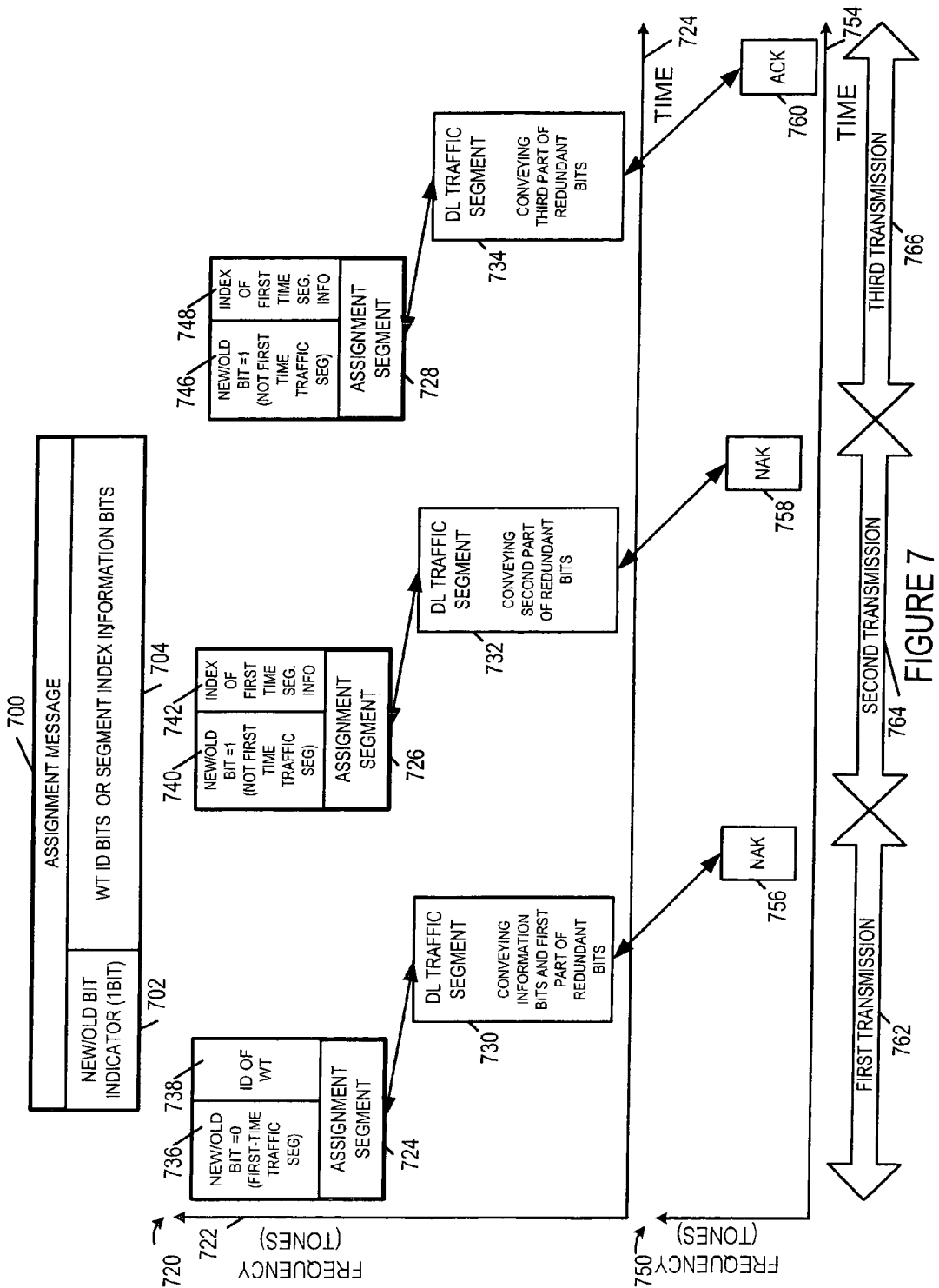
FIG. 7 illustrates an exemplary assignment message structure, and provides an example of using incremental redundant codes, e.g., incremental redundant LDPC codes, in accordance with the present invention.

FIG. 7 expands on the example of FIG. 5 and shows the assignment information, e.g., assignment segments, for the three traffic segments of the block of information bits communicated in the FIG. 5 example, in accordance with the invention. FIG. 7 includes an exemplary assignment segment message 700 including a new/old indicator bit 702, and WT ID/segment index bits 704. New/old indicator bit 702 indicator is a 1 bit indicator that may be used to communicate whether the corresponding traffic segment is a first time traffic segment or not a first time traffic segment. If new/old bit indicator is, e.g., 0, the assignment message may communicate that this assignment is for a first time traffic segment and that the information in WT ID/Segment index bits 704 indicates an identifier of the WT being assigned the corresponding traffic segment. If new/old bit indicator is, e.g., 1, the assignment message may communicate that this assignment is not a first time traffic segment, that the information in WT ID/Segment index bits 704 indicates an index of the first time segment.

FIG. 7 further includes a diagram 720 of downlink channels plotting frequency, e.g., frequency tone on vertical axis 722 vs time on horizontal axis 724. Diagram 720 includes three downlink assignment segments 724, 726, 728, and three traffic channel segments 730, 732, 734, respectively. FIG. 7 also includes a diagram 750 of uplink channels plotting frequency, e.g., frequency tones, on the vertical axis 752 vs time on horizontal axis 754. Diagram 750 includes three uplink acknowledgement segments 756, 758, 760, corresponding to downlink traffic segments 730, 732, 734, respectively.

Three exemplary transmission intervals are shown, first transmission interval 762, second transmission interval 764, and third transmission interval 766. In the first transmission interval 762, assignment segment 724 conveys new/old indicator bit=0 736 indicating that corresponding traffic segment 730 is a first time traffic segment. Assignment segment 724 also conveys WT ID/segment index bits 738 indicating an identifier of the wireless terminal assigned to traffic segment 730. The base station transmits the traffic segment 730 information including information bits and a first part of the redundant bits. The intended WT is unable to decode the information bits successfully and transmits an uplink NAK signal on corresponding uplink acknowledgement channel segment 756.

In the second transmission time interval 764, assignment segment 726 conveys new/old indicator bit=1 740 indicating that the corresponding traffic segment 732 is not a first time traffic segment. Assignment segment 726 also conveys WT ID/segment index information 742 indicating the index of the first time segment, e.g., information indicating the index of traffic segment 732. The base station transmits the traffic segment 732 information including a second part of the redundant bits. The intended WT is still unable to decode the information bits successfully and transmits an uplink NAK signal on corresponding uplink acknowledgement channel segment 758.

In the third transmission time interval 766, assignment segment 728 conveys new/old indicator bit=1 746 indicating that the corresponding traffic segment 734 is not a first time traffic segment. Assignment segment 728 also conveys WT ID/segment index information 748 indicating the index of the first time segment, e.g., information indicating the index of traffic segment 734. The base station transmits the traffic segment 734 information including a third part of the redundant bits. The intended WT is able to decode the information bits successfully and transmits an uplink ACK signal on corresponding uplink acknowledgement channel segment 760.

The same incremental assignment method can be used to enable the use of incremental redundant codes in the uplink traffic segments. In the uplink case, the base station should, and in various embodiments does, indicate that an assignment is for a first-time traffic segment when the base station is ready to receive a new block of information bits. Upon receipt of the assignment segment for a first-time segment, the wireless terminal transmitter should start a new block of information bits and generate a large block of parity check bits for the new block of information bits. The wireless terminal should, and does, transmit the block of information bits and the first part of the parity check bits. If the base station receiver cannot decode the block of information bits, the base station should and does assign another uplink traffic segment. The assignment includes information indicating that the traffic segment is not meant for a first-time segment to be transmitted. Furthermore, the assignment includes the incremental assignment. Upon receipt of the assignment segment not for a first-time segment, the wireless terminal transmitter traces back, through the information stored in its memory, to retrieve the corresponding block of information bits using the incremental assignment information, and then transmits the subsequent part of the parity check bits in accordance with the invention.

Multi-level negative acknowledgement and adaptive resource allocation shall be described in accordance with the present invention. The present invention is further directed to a method of sending an acknowledgment segment corresponding to a traffic segment in order to improve the performance of the hybrid ARQ scheme using incremental redundant coding, e.g., incremental redundant LDPC coding.

In the above method, the receiver sends an ACK if the block of information bits has been decoded correctly and a NAK if more redundant bits are needed to decode the block of information bits. Upon receipt of a NAK, the transmitter sends incremental redundant bits to improve the probability that the receiver can decode the block of information bits correctly.

However, when the transmitter has only a NAK feedback from the receiver, the transmitter may not know how much incremental information is needed. The effective amount of incremental information delivered depends on how many redundant bits are transmitted and on how much energy is expended per bit. In some cases, the receiver may need a large number of incremental information, while the transmitter only sends a small amount, resulting in an excessive latency due to a large number of ARQ loops required to achieve successful transmission. In other cases, the receiver may need a small amount of incremental information, e.g., a few bits, while the transmitter sends a large amount of redundant information, wasting system resources.

In accordance one feature of the invention, when the receiver needs incremental information, it first estimates the amount effective incremental information, e.g. in bits, it requires in order to correctly decode the block of information bits, and then sends a multi-level NAK, where each level of NAK represents a distinct quantity of required effective incremental information. Thus, in such an embodiment, the receiver transmits, in addition to a NAK, an indicator of the amount of redundant information to be supplied, e.g., as determined by its estimate of required bits. In such an embodiment, when the receiver does not need any incremental redundant bits, it sends an ACK. The above method of indicating the amount of redundant information needed or desired is applicable to both the downlink and the uplink traffic segments. The effective information included in incremental bits is a measure of the 'true' information content, which may be different from the number of transmitted incremental redundant bits.

The amount of air link resource (number of transmitted symbols, their power and the modulation) allocated to a traffic segment determines the number of effective incremental bits included in the segment. For example, the transmission power of the traffic segment, and in some systems, the amount of frequency bandwidth and time increase with the number of effective incremental redundant bits required in the segment. Thus, based on the feedback information from the multi-level NAK, the transmitter can adaptively determine the number of effective incremental redundant bits to be included in the traffic segment and accordingly adjust the amount of air link resource allocated to the traffic segment. In order to facilitate the receiver operation, the incremental assignment may, and in various embodiments does, also include information that indicates the number of effective incremental bits included in the traffic segment. In accordance with the invention, the number of bits included in the $k^{th}$-time segment transmission may not be, and in various cases is not, the same for all k, where k>0.

Figure 8:
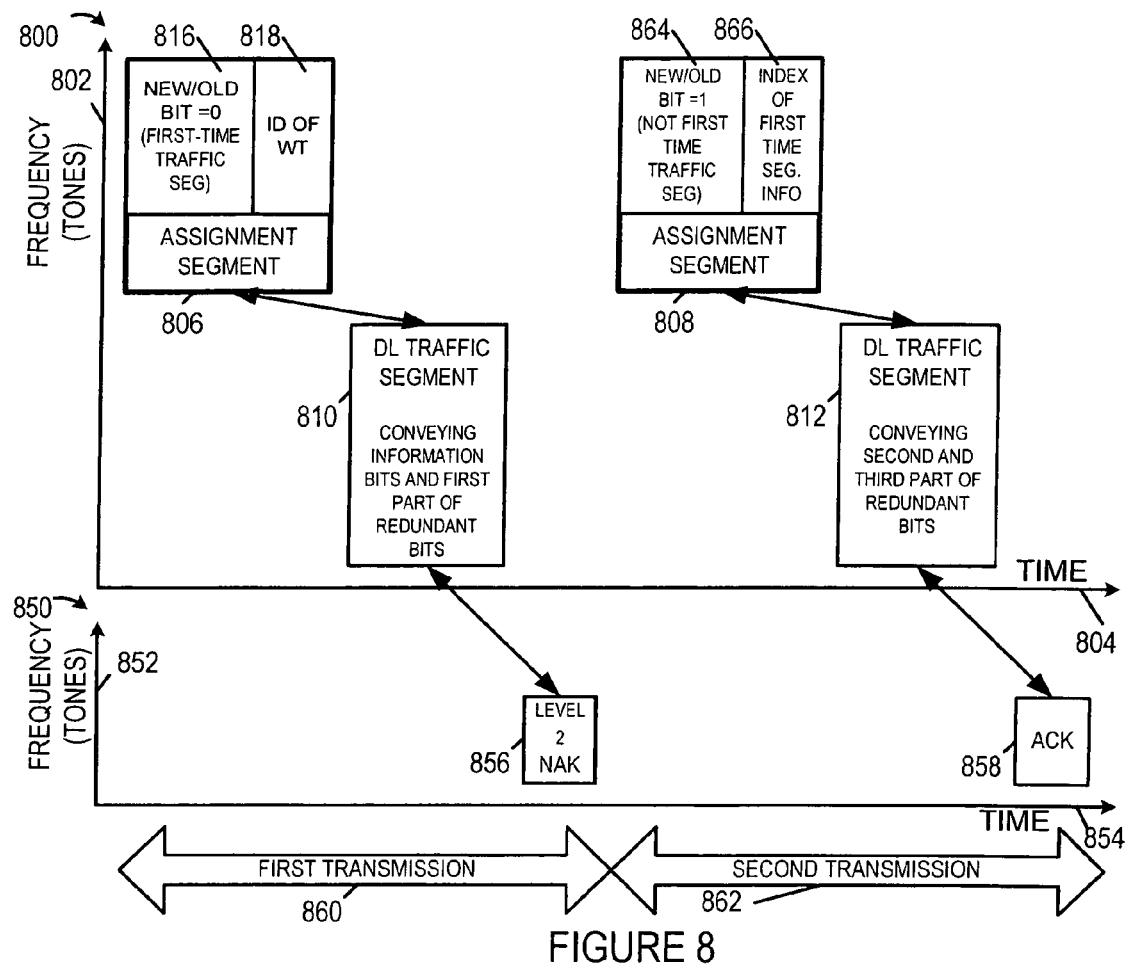
FIGS. 8 and 12 illustrate examples of using incremental redundant codes and using a multi-level NAK signal, in accordance with the present invention.

FIG. 8 continues the example in FIG. 5 and shows how a 3-level NAK acknowledgment, in accordance with the invention, can improve the ARQ performance. FIG. 8 includes a diagram 800 of downlink channels plotting frequency, e.g., frequency tones, on vertical axis 802 vs time on horizontal axis 804. Diagram 800 includes two assignment segments 806, 808 and two corresponding downlink traffic channel segments 810, 812, respectively. FIG. 8 also includes a diagram 850 of uplink channels plotting frequency, e.g., frequency tones, on vertical axis 852 vs time on horizontal axis 854. Diagram 850 includes two uplink acknowledgement segments 856, 858 corresponding to downlink traffic segments 810, 812, respectively.

Specifically, when a block of information bits is to be transmitted, the transmitter generates a large low-density parity check codeword. In the first transmission time 860, the base station transmits an assignment message in assignment segment 806 including a new/old bit indicator 816=0 indicating that traffic segment 810 is a first time traffic segment. The assignment message in assignment segment 806 also includes WT ID/segment index bits 818 including an identifier of the assigned WT for downlink traffic segment 810. In the first traffic segment 810, the information bits and the first part of the codeword is transmitted. Now suppose that the receiver does not decode the information bits and thus sends a level-2 NAK in acknowledgment segment 856. Upon receipt of the level-2 NAK, the transmitter sends an assignment message in assignment segment 808. The assignment message includes a new/old bit indicator 864=1 indicating that the corresponding traffic segment 812 is not a first time traffic segment and a WT ID/segment indicator bits 866 including information indicating the index of the first time segment. The transmitter then sends both the second and the third parts of the parity check bits in the second traffic segment 812 at a power level targeting the delivery of a certain number of effective information bits. Using both of the received segments 810, 812 to decode the information bits, the receiver now likely decodes the information bits successfully this time and sends ACK in acknowledgement segment 858. In this example, the multi-level NAK mechanism helps to reduce the required ARQ loops, as compared with the example shown in FIG. 7.

Figure 9:
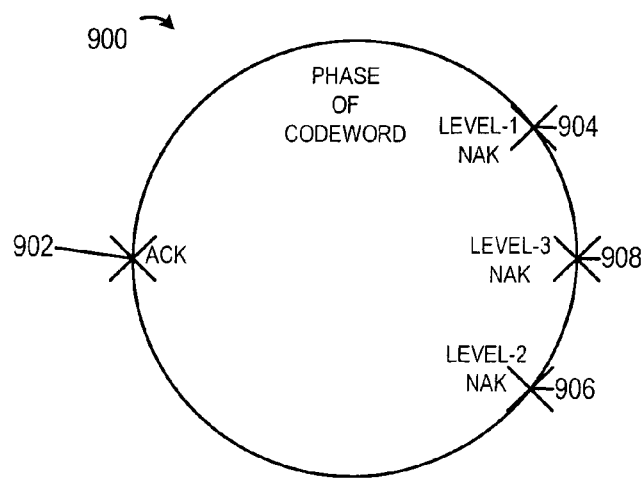
FIG. 9 is a drawing illustrating an exemplary representation of the phase of the codeword of an acknowledgement signal including an ACK and an exemplary 3 level NAK, in accordance with the present invention.

FIG. 9 is a drawing 900 used to illustrate the phase of the ack/multi-level nak codeword in one exemplary embodiment of the invention. FIG. 9 includes a phase representation for an ACK 902, for a Level-1NAK 904, for a Level-2 NAK 906, and for a Level-3 NAK 908. As illustrated in FIG. 9, the codeword used in the acknowledgment segment is such that the Euclidean distance between ACK 902 and any of the multi-level NAKs 904, 906, 908 is much larger than that between any two of the multi-level NAKs 904, 906, 908.

Figure 10:
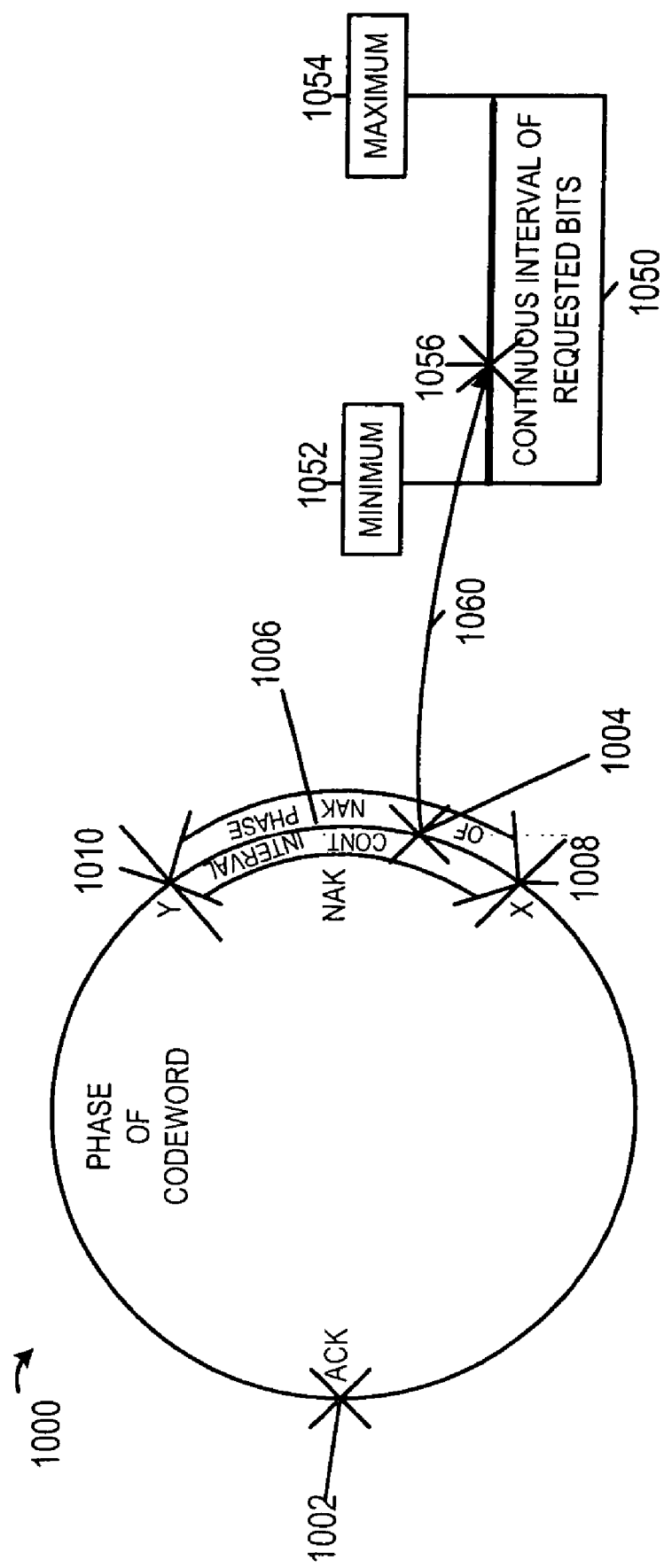
FIG. 10 is a drawing illustrating an exemplary representation of the phase of the codeword of an acknowledgement signal including an ACK and a continuous range of NAK and how an exemplary NAK maps into a range of requested bits, in accordance with the present invention.
Figure 11A:
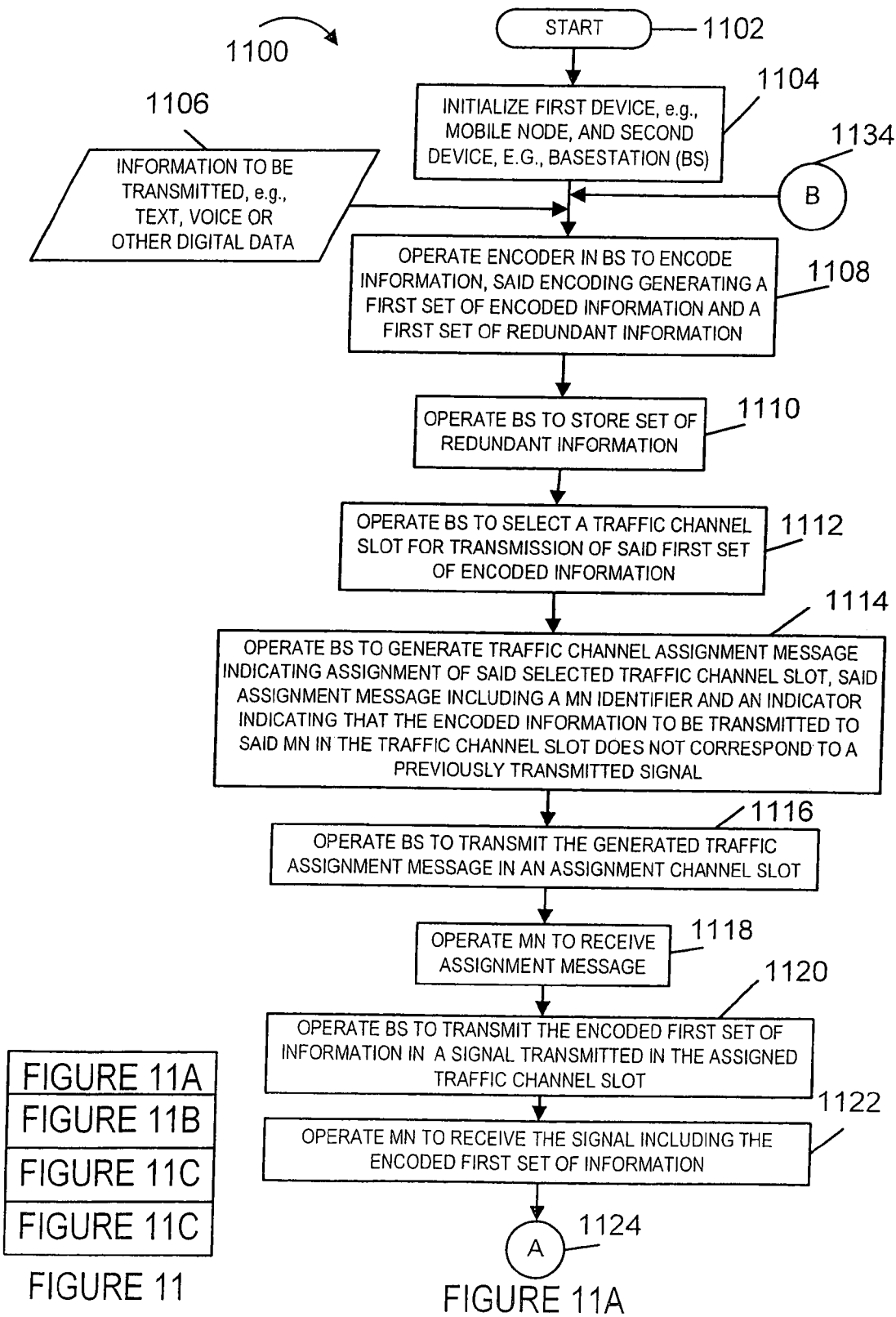
FIG. 11, which comprises the combination of FIGS. 11A-11D, illustrates steps performed in accordance with one exemplary embodiment in which multi-level NAKs are used in accordance with the invention.
Figure 11B:
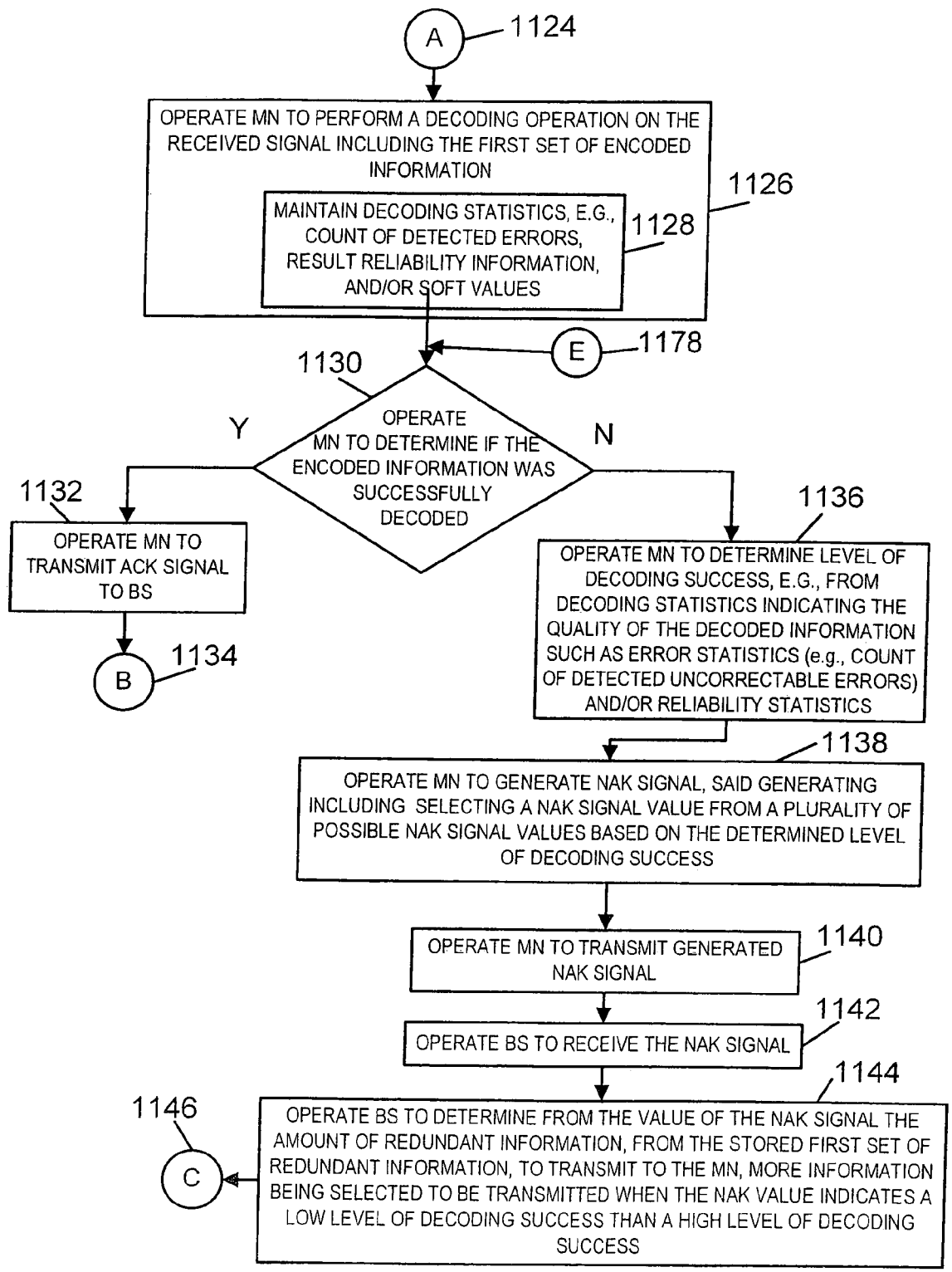
Figure 11C:
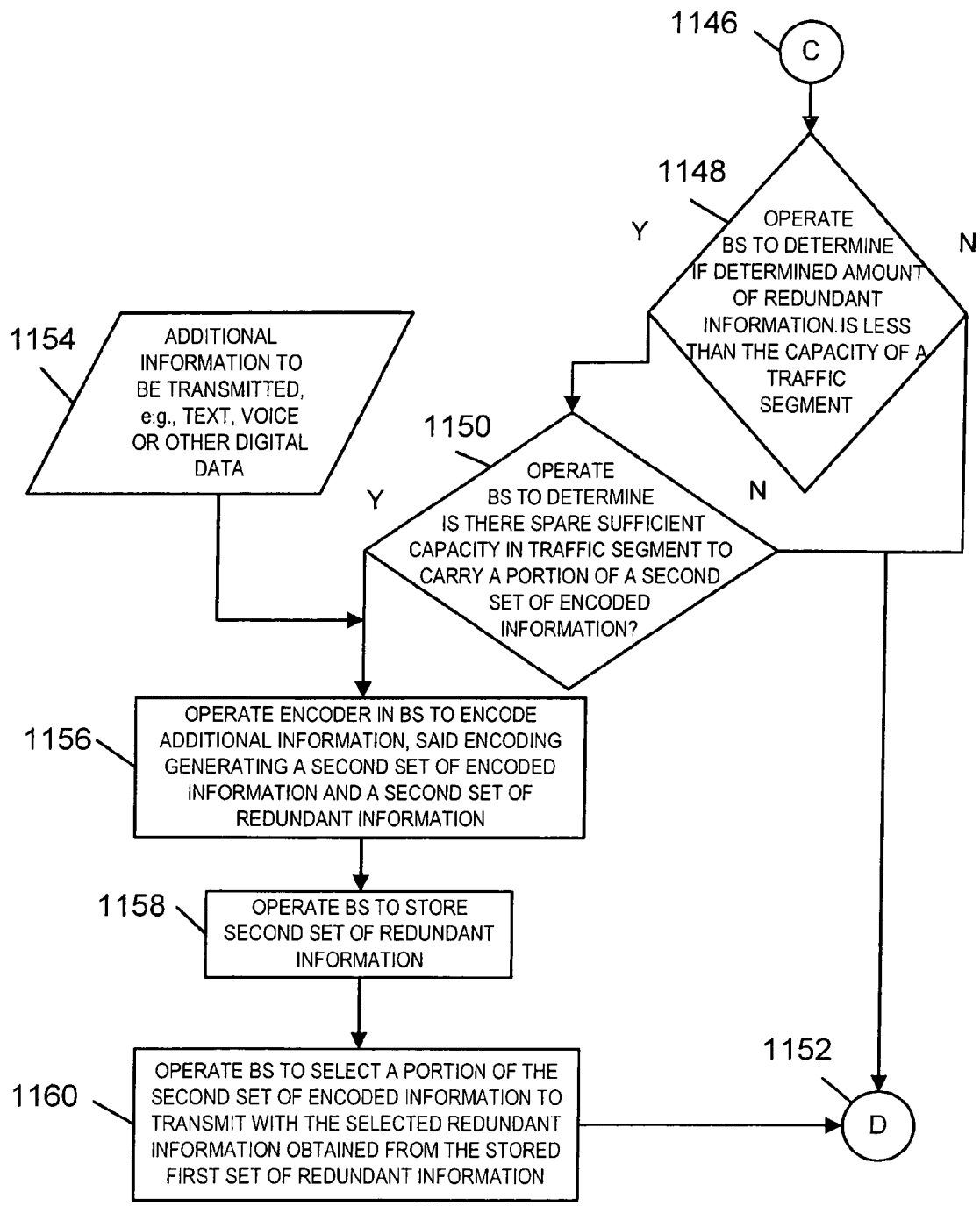
Figure 11D:
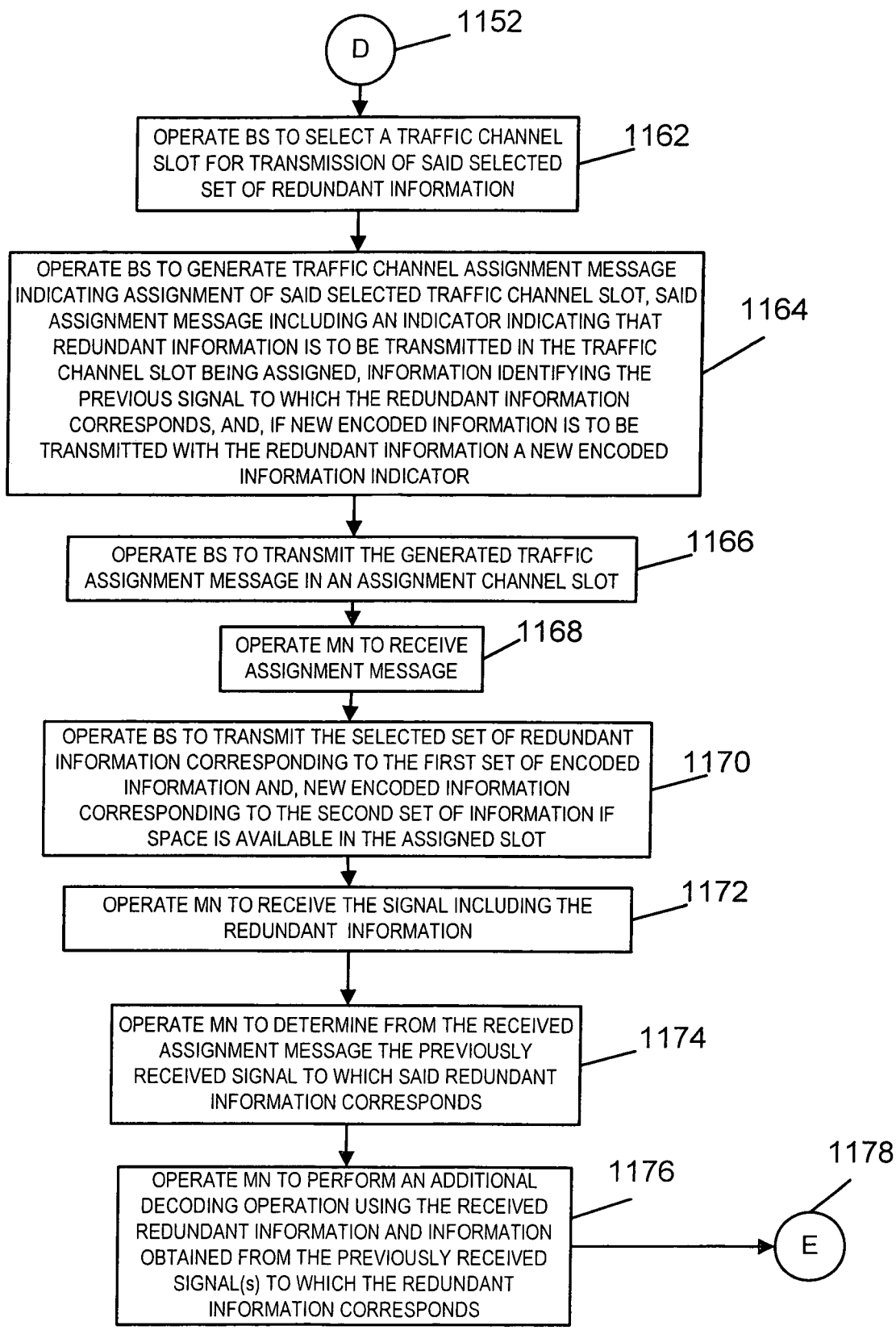

In another embodiment of the invention, the number of NAK levels is infinite. FIG. 10 is a drawing 1000 used to illustrate the phase of the ack/infinite level NAK. FIG. 10 includes a phase representation of an ACK 1002, a phase representation of an exemplary NAK 1004, and a continuous interval of NAK phase 1006. FIG. 10 also includes a continuous integer interval of requested bits 1050 corresponding to the continuous interval of NAK phase 1006, a minimum value for requested bits 1052, and a maximum value for requested bits 1054. FIG. 10 shows that the phase of the received symbol or codeword, which is a continuous variable from x 1008 to y 1010, can be mapped to a continuous integer interval of the number of additional information bits needed. FIG. 10 shows exemplary NAK 1004 mapped to, as illustrated by arrow 1060, a specific number of requested bits 1056.

FIG. 11, which comprises the combination of FIGS. 11A through 11D, is a flowchart 1100 of an exemplary method of automatic repeat request (ARQ) in accordance with the present invention. From start node 1102 operation proceeds to step 1104. In step 1104, a first device, e.g., a mobile node, and a second device, e.g., a base station (BS) are initialized.

Operation proceeds from step 1104 to step 1108. Information to be transmitted, e.g., text, voice or other digital data 1106 is processed by the base station in step 1108. In step 1108, the encoder in the base station encodes the information 1106, said encoding generating a first set of encoded information and a first set of redundant information. The first set of encoded information may include, e.g., a block of encoded information bits 510 and a first portion 514 of error correction bits generated as part of the encoding process the first set of redundant information may include the remaining redundant bits 516, 518, 519 generated as part of the encoding performed on the information 1106. In step 1110, the base station stores the first set of redundant information. Operation proceeds from step 1110 to step 1112. In step 1112, the BS selects a traffic channel slot, and thus a traffic channel segment corresponding to the selected slot, for transmission of the first set of encoded information. In step 1114, the BS generates a traffic channel assignment message indicating assignment of the selected traffic channel slot, said assignment message including an MN identifier and an indicator indicating that the encoded information to be transmitted to said MN in the traffic channel slot does not correspond to a previously transmitted signal. Next, in step 1116, the BS transmits the generated assignment message in an assignment channel slot, e.g., the traffic channel slot corresponding to the assignment slot used to transmit the assignment message. Next, in step 1118, the MN receives the assignment message. Then in step 1120, the BS transmits the encoded first set of information in a signal transmitted in the assigned traffic channel slot. Operation proceeds from step 1120 to step 1122. In step 1122, the MN receives the signal including the encoded first set of information. Operation proceeds from step 1122 via connecting node A 1124 to step 1126. In step 1126, the MN performs a decoding operation on the received signal which includes the first set of encoded information. As part of the decoding operation of step 1126, sub-step 1128 is performed. In sub-step 1128, the MN maintains decoding statistics, e.g., count of detected uncorrectable errors, decoding result reliability information, and/or soft values. Operation proceeds from step 1126 to step 1130. In step 1130, the MN determines if the decoded information was successfully decoded. This may be done by comparing one or more decoding statistics to a threshold level indicating successful decoding. The threshold level may be, e.g., a count of zero uncorrectable errors in the results of the decoding process.

If it is determined in step 1130 that the encoded information was successfully decoded, then operation proceeds to step 1132. In step 1132, the MN transmits an ACK signal to the BS. Operation proceeds from step 1132 via connecting node B 1134 to step 1108 where the BS processes additional information to be transmitted.

If it is determined in step 1130 that the encoded information was not successfully decoded, operation proceeds to step 1136. In step 1136, the MN determines the level of decoding success, e.g., from decoding statistics indicating the quality of the decoded information such as error statistics (e.g., count of detected uncorrectable errors) and/or reliability statistics. Operation proceeds from step 1136 to step 1138. In step 1138, the MN generates a NAK signal, said generating including selecting a NAK signal value from a plurality of possible NAK signal values based on the determined level of decoding success. Then in step 1140, the MN transmits the generated NAK signal. Next, in step 1142, the BS receives the NAK signal. Operation proceeds from step 1142 to step 1144. In step 1144, the BS determines from the value of the received NAK signal the amount of redundant information, from the stored first set of redundant information, to transmit to the MN. More information is selected to be transmitted when the NAK value indicates a low level of decoding success, e.g., a large number of errors in the decoding result, than is selected to be transmitted when the NAK value indicates a high level of decoding success, e.g., few errors. Operation proceeds from step 1144 via connecting node C 1146 to step 1148.

In step 1148, the BS determines if the determined amount of redundant information is less than the capacity of a traffic segment. If the BS determines that the determined amount of redundant information is less than the capacity of a traffic segment, operation proceeds to step 1150, otherwise operation proceeds to connecting node D 1152.

In step 1150, the BS determines if there is sufficient spare capacity in the traffic segment to carry a portion of a second set of encoded information. If in step 1150, the BS determines that there is sufficient capacity in the traffic segment to carry a portion of a second set of encoded information, operation proceeds to step 1156, otherwise operation proceeds to connecting node D 1152.

In step 1156, the BS processes additional information to be transmitted, e.g., text, voice, or other digital data 1154. In step 1156, the BS encodes additional information 1154, said encoding generating a second set of encoded information and a second set of redundant information. From step 1156, operation proceeds to step 1158. In step 1158, the BS stores the second set of redundant information. Operation proceeds from step 1158 to step 1160. In step 1160, the BS selects a portion of the second set of encoded information to transmit with the selected redundant information obtained from the stored first set of redundant information. Then, operation proceeds to connecting node D 1152.

From connecting node D 1152, operation proceeds to step 1162. In step 1162, the BS selects a traffic channel slot for transmission of said selected set of redundant information. Next, in step 1164 the BS generates a traffic channel assignment message indicating assignment of said selected traffic channel slot, said assignment message including an indicator indicating that redundant information is to be transmitted in the traffic channel slot being assigned, information identifying the previous signal to which the redundant information corresponds, and if new encoded information is to be transmitted with the redundant information, a new encoded information indicator. The information identifying the previous signal may be, e.g., a traffic slot or an assignment slot identifier associated with the previous signal and/or a mobile node identifier associated with the previous signal. Then, in step 1166 the BS transmits the generated traffic assignment message in an assignment channel slot. Next, in step 1168, the MN receives the assignment message that was transmitted in step 1166. Operation proceeds from step 1168 to step 1170. In step 1170, the BS transmits the selected set of redundant information corresponding to the first set of encoded information and, new encoded information corresponding to the second set of information assuming space is available in the assigned slot. Then, in step 1172, the MN receives the signal including the redundant information. Operation proceeds from step 1172 to step 1174. In step 1174, the MN determines from the received assignment message the previously received signal to which said redundant information corresponds. Operation proceeds from step 1174 to step 1176. In step 1176, the MN performs an additional decoding operation using the received redundant information and information obtained from the previously received signal(s) to which the redundant information corresponds.

Operation proceeds from step 1176 via connecting node E 1178 to step 1130, where the MN determines if the encoded information was successfully decoded. Operation continues from step 1176 as previously discussed, e.g., with repeated NAKs and transmission of additional redundant information until successful decoding of the first set of encoded information is achieved.

Figure 12:
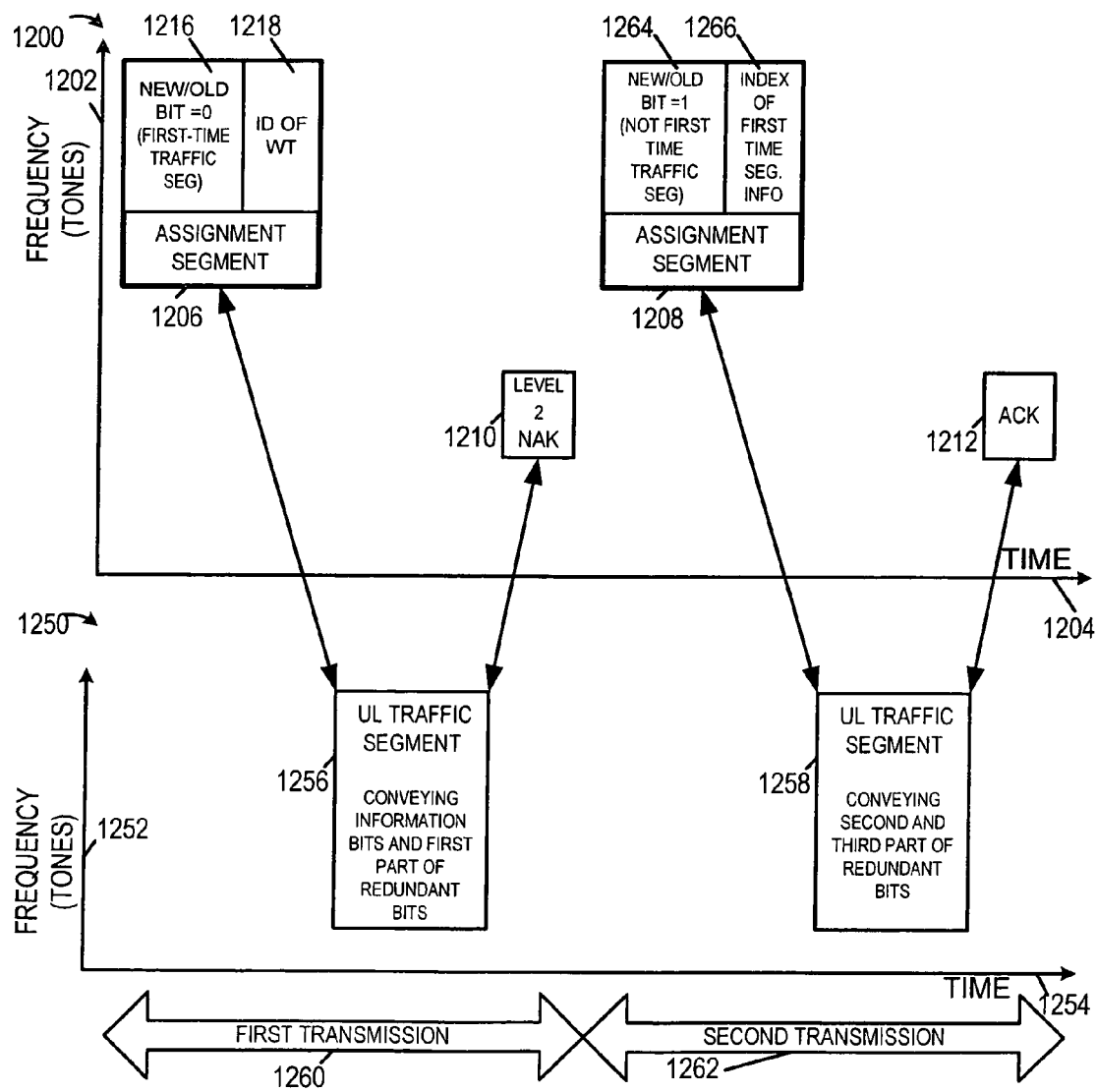

FIG. 12 is another example of use of a multi-level NAK, in accordance with the invention in the context of uplink information transmissions. In the FIG. 12 example the base station is responsible for assigning uplink traffic channel segments in addition to downlink traffic channel segments as explained in regard to the FIG. 8 example. FIG. 12 includes a diagram 1200 of downlink channels plotting frequency, e.g., frequency tones, on vertical axis 1202 vs time on horizontal axis 1204. Diagram 1200 includes two uplink assignment segments 1206, 1208 and two acknowledgement segments 1210, 1212 used to communicate information about signals sent on the uplink. FIG. 8 also includes a diagram 1250 of uplink channels plotting frequency, e.g., frequency tones, on vertical axis 1252 vs time on horizontal axis 1254. Diagram 1250 includes two uplink traffic channel segments 1256, 1258. Assignment segment 1206 corresponds to uplink traffic segment 1256; uplink traffic segment 1256 corresponds to acknowledgement segment 1210. Assignment segment 1208 corresponds to uplink traffic segment 1258; uplink traffic segment 1258 corresponds to acknowledgement segment 1212.

Specifically, when a block of information bits is to be transmitted, the transmitter in the WT generates a large low-density parity check codeword. In the first transmission time 1260, the base station transmits an assignment message in assignment segment 1206 including a new/old bit indicator 1216=0 indicating that the assigned uplink traffic segment 1256 is a first time traffic segment. The assignment message in assignment segment 1206 also includes WT ID/segment index bits 1218 including an identifier of the assigned WT for uplink traffic segment 1256. In the first uplink traffic segment 1256, the information bits and the first part of the codeword comprising a set of encoded information is transmitted by the WT to the BS. Now suppose that the receiver in the BS does not decode the information bits and thus sends a level-2 NAK in acknowledgment segment 1210. The transmitter in the BS sends to the WT an uplink assignment message in assignment segment 1208. The assignment message includes a new/old bit indicator 1264=1 indicating that the corresponding traffic segment 1258 is not a first time traffic segment and a WT ID/segment indicator bits 1266 including information indicating the index of the first time segment. The WT receives the Level-2 NAK in acknowledgement channel segment 1210 and the assignment in assignment segment 1208. The WT's transmitter then sends redundant information selected in response to the NAK, i.e., both the second and the third parts of a set of stored parity check bits, in the second uplink traffic segment 1258 at a power level targeting the delivery of a certain number of effective information bits. The BS receives the uplink traffic channel segment 1258. Using information from both of the received segments 1256, 1258 the BS decodes the information bits. In response to determining that the decoding operation was successful, the BS's receiver sends an ACK in acknowledgement segment 1212. In this example, the multi-level NAK mechanism helps to reduce the required ARQ loops, as compared with the example shown in FIG. 7.

It should be noted that the traffic channel segment corresponding to an assignment segment often follows, in terms of time, the assignment segment. However, it is possible for the assignment and corresponding traffic channel segments to partially or fully overlap resulting in simultaneous transmission in an assignment segment and corresponding traffic segment where different frequencies are used for the different segments.

While described in the context of an OFDM system, the ARQ methods and apparatus of the present invention, as well as the novel acknowledgment methods described herein, are applicable to a wide range of communications systems including many non-OFDM and/or non-cellular systems. In addition, while described in the context of an exemplary wireless communications system, it is to be understood that the methods and apparatus of the present invention can be used in other applications which do not involve wireless communications links but where it is desirable to reduce or minimize the need to retransmit data lost during communication between a transmitting and receiving device. For example, the method of the invention can be used with fiber optic communications, wire based networks and other communications systems where the transmission of information occurs.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method, the method comprising:
operating a first communications device to:
perform a decoding operation on a first signal including encoded signal information;
determine if the encoded signal information included in the first signal was successfully decoded;
when it is determined that said encoded information was successfully decoded, generating an ACK signal having an ACK signal value; and when it is determined that said encoded information was not successfully decoded, generating a first NAK signal having one of a plurality of possible NAK signal values, each NAK signal value, in the plurality of NAK signal values, differing from any other one of the NAK signal values in said plurality by an amount which is less than the smallest amount any one of said NAK signal values differs from said ACK signal value, each of said plurality of possible NAK signal values corresponding to a different level of decoding success.

2. The method of claim 1, wherein said decoding operation produces decoded information, the step of generating a first NAK signal including:
selecting the first NAK signal value as a function of the quality of the decoded information.

3. The method of claim 1,
wherein operating the first device to perform a decoding operation includes:
determining the quality of decoded information generated by decoding said encoded information;
wherein operating the first device to generate a first NAK signal includes operating the first device to select the first NAK signal value as a function of the determined quality of the decoded information; and
wherein operating the first device further includes operating the first device to transmit the generated first NAK signal.

4. The method of claim 3, wherein determining the quality of the decoded information includes:
maintaining decoding statistics indicating the reliability of the decoded information, said decoding statistics indicating the quality of the decoded information.

5. The method of claim 4, wherein the maintained decoding statistics include a count of the number of detected errors in the decoded information.

6. The method of claim 3, further comprising:
operating a second device to:
i) receive said first NAK signal; and.
ii) determine, from said first NAK signal value, an amount of redundant information to transmit to said first device from, different amounts of redundant information being determined for at least two different NAK signal values.

7. The method of claim 3, further comprising:
operating the first device to:
receive in a second signal including redundant information corresponding to said first received encoded signal;
perform an additional decoding operation using said redundant information and information obtained from said first received signal; and
determine if the additional decoding operation successfully decoded the encoded signal information included in the first signal.

8. The method of claim 7, wherein said step of operating the first device to perform an additional decoding operation includes:
receiving a traffic channel assignment message from a second device; and
identifying from information included in said traffic channel assignment message, the first signal to which said second signal corresponds.

9. The method of claim 8,
wherein said first device is a mobile node and said second device is a base station; and
wherein the information included in said traffic channel assignment message used to identify the first signal is an index of a traffic segment used to transmit the first signal.

10. A communications method, the method comprising:
performing a decoding operation on a first signal including encoded signal information, said decoding operation including determining the quality of decoded information generated by decoding said encoded information;
determining if the encoded signal information included in the first signal was successfully decoded;
when it is determined that said encoded information was not successfully decoded, generating a first NAK signal having one of a plurality of possible NAK signal values, each of said plurality of possible NAK signal values corresponding to a different level of decoding success, generating a first NAK signal including selecting the first NAK signal value as a function of the determined quality of the decoded information;
transmitting the generated first NAK signal; receiving a traffic channel assignment message;
identifying from information included said traffic channel assignment message, the first signal to which a second signal corresponding to the traffic assignment message corresponds;
receiving in the second signal redundant information corresponding to said first received encoded signal;
performing an additional decoding operation using said redundant information and information obtained from said first received signal;
determining if the additional decoding operation successfully decoded the encoded signal information included in the first signal; and
wherein the information included in said traffic channel assignment message used to identify the first signal is a traffic channel index difference indicating a difference between the index of a traffic channel segment associated with the assignment message and a traffic channel segment used to transmit the first signal.

11. The method of claim 7, wherein said first device is a base station and said second device is a mobile node, the method further comprising:
operating the first device to transmit an uplink channel assignment message to the second device;
operating the second device to identify from information included in the uplink channel assignment message the first signal for which redundant information is to be transmitted in an uplink channel segment assigned by said channel assignment message; and
operating the second device to transmit said second signal including redundant information.

12. The method of claim 11,
wherein the information included in said uplink channel assignment message used to identify the first signal is an index of a uplink traffic segment used to transmit the first signal.

13. The method of claim 11,
wherein the information included in said traffic channel assignment message used to identify the first signal is an uplink traffic channel index difference indicating a difference between an index of an uplink traffic channel segment associated with the assignment message and an uplink traffic channel segment used to transmit the first signal.

14. The method of claim 7, wherein said second signal includes, in addition to said redundant information, new encoded information, the method further comprising:

operating said first device to decode said new encoded information.

15. The method of claim 7, further comprising:
operating the first device to determine if the encoded signal information included in the first signal was successfully decoded by said additional decoding operation; and
when it is determined that said encoded information was not properly decoded by said additional decoding operation, operating the first device to generate a second NAK signal having one of said plurality of possible NAK signal values, each of said plurality of possible NAK signal values corresponding to a different level of decoding success, operating the first device to generate a second NAK signal including selecting a second NAK signal value as a function of the quality of decoded information generated by said additional decoding operation.

16. A communications device comprising:
means for performing a decoding operation on a first signal including encoded signal information;
means for determining if the encoded signal information included in the first signal was successfully decoded; and
means for generating a first NAK signal having one of a plurality of possible NAK signal values, when it is determined that said encoded information was not successfully decoded, each of said plurality of possible NAK signal values corresponding to a different level of decoding signal success, each NAK signal value, in the plurality of NAK signal values, differing from any other one of the NAK signal values in said plurality by an amount which is less than the smallest amount any one of said NAK signal values differs from an ACK signal value.

17. The device of claim 16,
wherein said means for performing a decoding operation produces decoded information; and
wherein said means for generating a first NAK signal selects the first NAK signal value as a function of the quality of the decoded information.

18. The communications device of claim 17, further comprising:
a transmitter, coupled to said means for generating a first NAK signal, for transmitting the generated first NAK signal;
a receiver for receiving a second signal including redundant information corresponding to said first received encoded signal; and
wherein said means for perform a decoding operation includes means for performing an additional decoding operation using said redundant information and information obtained from said first received signal.

19. The communications device of claim 18, further comprising:
means for determining if the additional decoding operation successfully decoded the encoded signal information included in the first signal; and
means for generating a second NAK signal by selecting a second NAK signal value as a function of the quality of decoded information generated by said additional decoding operation, when it is determined that said encoded information was not properly decoded by said additional decoding operation, said second NAK signal having one of said plurality of possible NAK signal values.

20. A method of operating a communications device comprising:
encoding, using an encoder, information to be transmitted to produce a first set of encoded information and a set of redundant information;
transmitting said first set of encoded information in a first signal;
receiving a NAK signal from a device to which said first signal was transmitted; and
selecting a portion of the set of redundant information to transmit to said first device as a function of the value of the received NAK signal, said received NACK signal being one of a plurality of possible NACK signal values differing from any other one of the NAK signal values in said plurality by an amount which is less than the smallest amount any one of said NAK signal values differs from an ACK signal value, said function causing different amounts of redundant information to be selected for at least two different possible NAK signal values.

21. The method of claim 20, further comprising:
including in a first assignment signal used to assign a communications channel segment used to transmit said first signal, an indicator indicating that the first signal does not correspond to a previously transmitted signal; and
transmitting said first assignment signal prior to or in parallel with transmitting said first signal.

22. The method of claim 20, wherein selecting a portion of the set of redundant information to be transmit includes selecting a larger size portion of redundant information when the value of the NAK signal indicates a first level of received encoded signal quality than when the value of the NAK signal indicates a second level of received encoded signal quality that is better than said first level of received encoded signal quality.

23. The method of claim 22, further comprising:
transmitting a second assignment signal indicating an assignment of a channel segment to be used to transmit said selected portion of the set of redundant information, said second assignment signal including information identifying a channel segment used to transmit said first signal; and
transmitting the selected portion of the set of redundant information to said first device in a second information signal.

24. The method of claim 23, further comprising:
performing a second encoding operation on additional information to be transmitted to produce a second set of encoded information and a second set of redundant information; and
wherein transmitting a second information signal includes:
including in said second information signal a portion of said second set of encoded information.

25. The method of claim 20, wherein said encoding operation is a low density parity check coding operation.

26. A communications device comprising:
an encoder configured to encode information to be transmitted to produce a first set of encoded information and a set of redundant information;
a transmitter configured to transmit said first set of encoded information in a first signal;
a receiver configured to receive signals communicating acknowledgments, said acknowledgments being either a positive acknowledgement (ACK) signal value or one of a plurality of possible negative acknowledgment (NAK) signal values, from a first device to which said first signal was transmitted, each NAK signal value, in the plurality of possible NAK signal values, differing from any other one of the possible NAK signal values in said plurality by an amount which is less than the smallest amount any one of said NAK signal values differs from said ACK signal value;
a processing module configured to process received signals to recover there from communicated acknowledgement information; and
a retransmission control module configured to select a portion of the set of redundant information to transmit to said first device as a function of the recovered acknowledgement information, said function causing different amounts of redundant information to be selected for at least two different possible NAK signal values.

27. The device of claim 26, further comprising:
means for generating an assignment signal used to assign a communications channel segment used to transmit said first signal said assignment signal including an indicator indicating that the first signal does not correspond to a previously transmitted signal; and
means for controlling the transmitting said first assignment signal prior to transmitting said first signal.

28. The device of claim 26, wherein said means for selecting selects a portion of the set of redundant information to be transmitted selects a first size portion when the value of the NAK signal indicates a first level of received encoded signal quality, said first size portion being a larger size portion of redundant information than a second size portion which is selected by said means for selecting when the value of the NAK signal indicates a second level of received encoded signal quality that is better than said first level of received encoded signal quality.

29. A communications device comprising:
a decoder module configured to decode a first signal including encoded signal information;
a determination module configured to determine if the encoded signal information included in the first signal was successfully decoded;
a signal generation module configured to generate acknowledgement signals, said acknowledgement signals including an ACK signal having an ACK signal value, when it is determined that said encoded information was successfully decoded and a first NAK signal having one of a plurality of possible NAK signal values when it is determined that said encoded information was not successfully decoded, each NAK signal value, in the plurality of NAK signal values, differing from any other one of the NAK signal values in said plurality by an amount which is less than the smallest amount any one of said NAK signal values differs from said ACK signal value, each of said plurality of possible NAK signal values corresponding to a different level of decoding success.

30. The device of claim 29, further comprising:
a quality determination module configured to generate and maintain decoding information indicating the quality of a decoded signal.

31. The device of claim 29, further comprising:
a storage device including NAK level information, said NAK level information including discrete level information, said discrete level information including a plurality of NAK signal values, each possible NAK signal values corresponding to a different level of signal quality and a different phase.

32. A machine readable medium including machine executable instructions, for use in a communications device, said machine readable medium comprising:
instructions for causing said device to perform a decoding operation on a first signal including encoded signal information;
instructions for causing said device to determine if the encoded signal information included in the first signal was successfully decoded;
instructions for causing said device to generate an ACK signal having an ACK signal value, when it is determined that said encoded information was successfully decoded; and
instructions for causing said device to generate a first NAK signal having one of a plurality of possible NAK signal values when it is determined that said encoded information was not successfully decoded, each NAK signal value, in the plurality of NAK signal values, differing from any other one of the NAK signal values in said plurality by an amount which is less than the smallest amount any one of said NAK signal values differs from said ACK signal value, each of said plurality of possible NAK signal values corresponding to a different level of decoding success.

33. A communications device comprising:
encoding means for encoding information to be transmitted to produce a first set of encoded information and a set of redundant information;
transmitter means for transmitting said first set of encoded information in a first signal;
receiver means for receiving signals communicating acknowledgments, said acknowledgments being either a positive acknowledgement (ACK) signal value or one of a plurality of possible negative acknowledgment (NAK) signal values, from a first device to which said first signal was transmitted, each NAK signal value, in the plurality of possible NAK signal values, differing from any other one of the possible NAK signal values in said plurality by an amount which is less than the smallest amount any one of said NAK signal values differs from said ACK signal value;
processing means for processing received signals to recover there from communicated acknowledgement information; and
retransmission control means for selecting a portion of the set of redundant information to transmit to said first device as a function of the recovered acknowledgment information, said function causing different amounts of redundant information to be selected for at least two different possible NAK signal values.

34. A machine readable medium including machine executable instructions, for use in a communications device, said machine readable medium comprising:
instructions for causing said device to encode information to be transmitted to produce a first set of encoded information and a set of redundant information;
instructions for causing said device to transmit said first set of encoded information in a first signal;
instructions for causing said device to receive signals communicating acknowledgments, said acknowledgments being either a positive acknowledgement (ACK) signal value or one of a plurality of possible negative acknowledgment (NAK) signal values, from a first device to which said first signal was transmitted, each NAK signal value, in the plurality of possible NAK signal values, differing from any other one of the possible NAK signal values in said plurality by an amount which is less than the smallest amount any one of said NAK signal values differs from said ACK signal value; and instructions for causing said device to process the received signals to recover there from communicated acknowledgement information;
instructions for causing said device to select a portion of the set of redundant information to transmit to said first device as a function of the recovered acknowledgement information, said function causing different amounts of redundant information to be selected for at least two different possible NAK signal values.

* * * * *